(12) United States Patent
Barriac et al.

(10) Patent No.: US 10,091,783 B2
(45) Date of Patent: Oct. 2, 2018

(54) DETERMINING FRAME SIZE BASED ON FEEDBACK

(71) Applicant: QUALCOMM Incorporated, San Diego, CA (US)

(72) Inventors: Gwendolyn Denise Barriac, Encinitas, CA (US); George Cherian, San Diego, CA (US); Simone Merlin, San Diego, CA (US); Alfred Asterjadhi, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 139 days.

(21) Appl. No.: 15/224,052

(22) Filed: Jul. 29, 2016

(65) Prior Publication Data
US 2018/0035426 A1    Feb. 1, 2018

(51) Int. Cl.
| | | |
|---|---|---|
| *H04W 72/04* | (2009.01) | |
| *H04L 1/00* | (2006.01) | |
| *H04L 5/00* | (2006.01) | |
| *H04W 72/08* | (2009.01) | |

(52) U.S. Cl.
CPC ....... *H04W 72/0446* (2013.01); *H04L 1/0003* (2013.01); *H04L 1/0005* (2013.01); *H04L 1/0007* (2013.01); *H04L 1/0011* (2013.01); *H04L 1/0026* (2013.01); *H04L 5/0055* (2013.01); *H04W 72/082* (2013.01); *H04W 72/085* (2013.01)

(58) Field of Classification Search
CPC ..... H04W 84/12; H04L 5/0048; H04L 5/0055
See application file for complete search history.

(56) References Cited

U.S. PATENT DOCUMENTS

| | | | |
|---|---|---|---|
| 8,472,367 B2 | 6/2013 | Larsson et al. | |
| 8,982,803 B1 | 3/2015 | Zhang et al. | |
| 2007/0253386 A1* | 11/2007 | Li | H04L 1/0026 370/338 |
| 2010/0046665 A1* | 2/2010 | Sadowsky | H04B 7/0617 375/296 |
| 2012/0069927 A1 | 3/2012 | Oyman et al. | |
| 2015/0049827 A1 | 2/2015 | Bae et al. | |
| 2015/0103809 A1 | 4/2015 | Karimi et al. | |
| 2015/0295680 A1* | 10/2015 | Othman | H04L 1/1614 370/329 |
| 2016/0242195 A1* | 8/2016 | Kwon | H04W 72/121 |

FOREIGN PATENT DOCUMENTS

| | | | | |
|---|---|---|---|---|
| EP | 1538806 A2 * | 6/2005 | ......... | H04L 1/0007 |
| WO | 2015182044 A1 | 12/2015 | | |

OTHER PUBLICATIONS

International Search Report and Written Opinion—PCT/US2017/041136—ISA/EPO—dated Sep. 27, 2017.

* cited by examiner

*Primary Examiner* — Jamal Javaid
(74) *Attorney, Agent, or Firm* — Arent Fox, LLP and Qualcomm, Incorporated

(57) ABSTRACT

A method, an apparatus, and a computer-readable medium for wireless communication are provided. In one aspect, a first wireless device is configured to receive channel feedback from a second wireless device. The first wireless device is configured to determine a frame size based on the received channel feedback for transmitting a frame to the second wireless device. The first wireless device is configured to transmit the frame to the second wireless device based on the determined frame size.

27 Claims, 10 Drawing Sheets

DETERMINING FRAME SIZE BASED ON FEEDBACK

BACKGROUND

Field

The present disclosure relates generally to communication systems, and more particularly, to determining a frame size based on feedback (e.g., channel feedback).

Background

In many telecommunication systems, communications networks are used to exchange messages among several interacting spatially-separated devices. Networks may be classified according to geographic scope, which could be, for example, a metropolitan area, a local area, or a personal area. Such networks would be designated respectively as a wide area network (WAN), metropolitan area network (MAN), local area network (LAN), wireless local area network (WLAN), or personal area network (PAN). Networks also differ according to the switching/routing technique used to interconnect the various network nodes and devices (e.g., circuit switching vs. packet switching), the type of physical media employed for transmission (e.g., wired vs. wireless), and the set of communication protocols used (e.g., Internet protocol suite, Synchronous Optical Networking (SONET), Ethernet, etc.).

Wireless networks are often preferred when the network elements are mobile and thus have dynamic connectivity needs, or if the network architecture is formed in an ad hoc, rather than fixed, topology. Wireless networks employ intangible physical media in an unguided propagation mode using electromagnetic waves in the radio, microwave, infra-red, optical, etc., frequency bands. Wireless networks advantageously facilitate user mobility and rapid field deployment when compared to fixed wired networks.

SUMMARY

The systems, methods, computer-readable medium, and devices of the invention each have several aspects, no single one of which is solely responsible for the invention's desirable attributes. Without limiting the scope of this invention as expressed by the claims which follow, some features will now be discussed briefly. After considering this discussion, and particularly after reading the section entitled "Detailed Description," one will understand how the features of this invention provide advantages for devices in a wireless network.

One aspect of this disclosure provides a wireless device (e.g., an access point or a station) for wireless communication. The wireless device is configured to receive channel feedback from a second wireless device. The wireless device is configured to determine a frame size based on the received channel feedback for transmitting a frame to the second wireless device. The wireless device is configured to transmit the frame or frames to the second wireless device based on the determined frame size.

DETAILED DESCRIPTION

Figure 1:
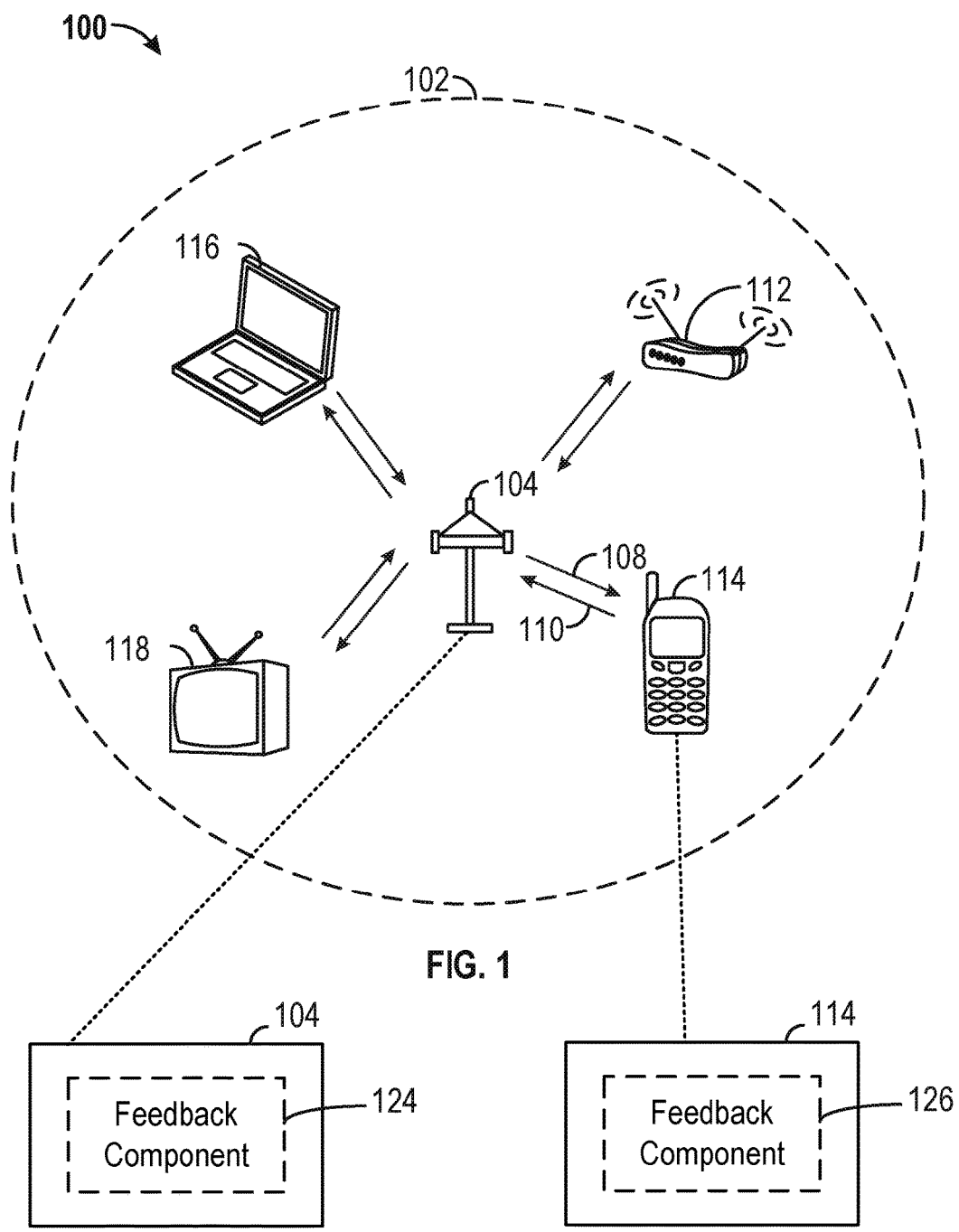
FIG. 1 shows an example wireless communication system in which aspects of the present disclosure may be employed.

Various aspects of the novel systems, apparatuses, computer program products, and methods are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the novel systems, apparatuses, computer program products, and methods disclosed herein, whether implemented independently of, or combined with, any other aspect of the invention. For example, an apparatus may be implemented or a method may be practiced using any number of the aspects set forth herein. In addition, the scope of the invention is intended to cover such an apparatus or method which is practiced using other structure, functionality, or structure and functionality in addition to or other than the various aspects of the invention set forth herein. It should be understood that any aspect disclosed herein may be embodied by one or more elements of a claim.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

Popular wireless network technologies may include various types of WLANs. A WLAN may be used to interconnect nearby devices together, employing widely used networking protocols. The various aspects described herein may apply to any communication standard, such as a wireless protocol.

In some aspects, wireless signals may be transmitted according to an 802.11 protocol using orthogonal frequency-division multiplexing (OFDM), direct-sequence spread spectrum (DSSS) communications, a combination of OFDM and DSSS communications, or other schemes. Implementations of the 802.11 protocol may be used for sensors, metering, and smart grid networks. Advantageously, aspects of certain devices implementing the 802.11 protocol may consume less power than devices implementing other wireless protocols, and/or may be used to transmit wireless signals across a relatively long range, for example about one kilometer or longer.

In some implementations, a WLAN includes various devices which are the components that access the wireless network. For example, there may be two types of devices: access points (APs) and clients (also referred to as stations or "STAs"). In general, an AP may serve as a hub or base station for the WLAN and a STA serves as a user of the WLAN. For example, a STA may be a laptop computer, a personal digital assistant (PDA), a mobile phone, etc. In an example, a STA connects to an AP via a Wi-Fi (e.g., IEEE 802.11 protocol) compliant wireless link to obtain general connectivity to the Internet or to other wide area networks. In some implementations a STA may also be used as an AP.

An access point may also comprise, be implemented as, or known as a NodeB, Radio Network Controller (RNC), eNodeB, Base Station Controller (BSC), Base Transceiver Station (BTS), Base Station (BS), Transceiver Function (TF), Radio Router, Radio Transceiver, connection point, or some other terminology.

A station may also comprise, be implemented as, or known as an access terminal (AT), a subscriber station, a subscriber unit, a mobile station, a remote station, a remote terminal, a user terminal, a user agent, a user device, a user equipment, or some other terminology. In some implementations, a station may comprise a cellular telephone, a cordless telephone, a Session Initiation Protocol (SIP) phone, a wireless local loop (WLL) station, a personal digital assistant (PDA), a handheld device having wireless connection capability, or some other suitable processing device connected to a wireless modem. Accordingly, one or more aspects taught herein may be incorporated into a phone (e.g., a cellular phone or smartphone), a computer (e.g., a laptop), a portable communication device, a headset, a portable computing device (e.g., a personal data assistant), an entertainment device (e.g., a music or video device, or a satellite radio), a gaming device or system, a global positioning system device, or any other suitable device that is configured to communicate via a wireless medium.

In an aspect, MIMO schemes may be used for wide area WLAN (e.g., Wi-Fi) connectivity. MIMO exploits a radio-wave characteristic called multipath. In multipath, transmitted data may bounce off objects (e.g., walls, doors, furniture), reaching the receiving antenna multiple times through different routes and at different times. A WLAN device that employs MIMO will split a data stream into multiple parts, called spatial streams (or multi-streams), and transmit each spatial stream through separate antennas to corresponding antennas on a receiving WLAN device.

The term "associate," or "association," or any variant thereof should be given the broadest meaning possible within the context of the present disclosure. By way of example, when a first apparatus associates with a second apparatus, it should be understood that the two apparatuses may be directly associated or intermediate apparatuses may be present. For purposes of brevity, the process for establishing an association between two apparatuses will be described using a handshake protocol that requires an "association request" by one of the apparatus followed by an "association response" by the other apparatus. It will be understood by those skilled in the art that the handshake protocol may require other signaling, such as by way of example, signaling to provide authentication.

Any reference to an element herein using a designation such as "first," "second," and so forth does not generally limit the quantity or order of those elements. Rather, these designations are used herein as a convenient method of distinguishing between two or more elements or instances of an element. Thus, a reference to first and second elements does not mean that only two elements can be employed, or that the first element must precede the second element. In addition, a phrase referring to "at least one of" a list of items refers to any combination of those items, including single members. As an example, "at least one of: A, B, or C" is intended to cover: A, or B, or C, or any combination thereof (e.g., A-B, A-C, B-C, and A-B-C).

As discussed above, certain devices described herein may implement the 802.11 standard, for example. Such devices, whether used as a STA or AP or other device, may be used for smart metering or in a smart grid network. Such devices may provide sensor applications or be used in home automation. The devices may instead or in addition be used in a healthcare context, for example for personal healthcare. They may also be used for surveillance, to enable extended-range Internet connectivity (e.g. for use with hotspots), or to implement machine-to-machine communications.

FIG. 1 shows an example wireless communication system 100 in which aspects of the present disclosure may be employed. The wireless communication system 100 may operate pursuant to a wireless standard, for example current or future 802.11 standards. The wireless communication system 100 may include an AP 104, which communicates with STAs (e.g., STAs 112, 114, 116, and 118).

A variety of processes and methods may be used for transmissions in the wireless communication system 100 between the AP 104 and the STAs. For example, signals may be sent and received between the AP 104 and the STAs in accordance with OFDM/OFDMA techniques. If this is the case, the wireless communication system 100 may be referred to as an OFDM/OFDMA system. Alternatively, signals may be sent and received between the AP 104 and the STAs in accordance with CDMA techniques. If this is the case, the wireless communication system 100 may be referred to as a CDMA system.

A communication link that facilitates transmission from the AP 104 to one or more of the STAs may be referred to as a downlink (DL) 108, and a communication link that facilitates transmission from one or more of the STAs to the AP 104 may be referred to as an uplink (UL) 110. Alternatively, a downlink 108 may be referred to as a forward link or a forward channel, and an uplink 110 may be referred to as a reverse link or a reverse channel. In some aspects, DL communications may include unicast or multicast traffic indications.

The AP 104 may suppress adjacent channel interference (ACI) in some aspects so that the AP 104 may receive UL communications on more than one channel simultaneously without causing significant analog-to-digital conversion (ADC) clipping noise. The AP 104 may improve suppression of ACI, for example, by having separate finite impulse response (FIR) filters for each channel or having a longer ADC backoff period with increased bit widths.

The AP 104 may act as a base station and provide wireless communication coverage in a basic service area (BSA) 102. A BSA (e.g., the BSA 102) is the coverage area of an AP (e.g., the AP 104). The AP 104 along with the STAs associated with the AP 104 and that use the AP 104 for communication may be referred to as a basic service set (BSS). It should be noted that the wireless communication system 100 may not have a central AP (e.g., AP 104), but rather may function as a peer-to-peer network between the STAs. Accordingly, the functions of the AP 104 described herein may alternatively be performed by one or more of the STAs.

The AP 104 may transmit on one or more channels (e.g., multiple narrowband channels, each channel including a frequency bandwidth) a beacon signal (or simply a "beacon"), via a communication link such as the downlink 108, to other nodes (STAs) of the wireless communication system 100, which may help the other nodes (STAs) to synchronize their timing with the AP 104, or which may provide other information or functionality. Such beacons may be transmitted periodically. In one aspect, the period between successive transmissions may be referred to as a superframe. Transmission of a beacon may be divided into a number of groups or intervals. In one aspect, the beacon may include, but is not limited to, such information as timestamp information to set a common clock, a peer-to-peer network identifier, a device identifier, capability information, a superframe duration, transmission direction information, reception direction information, a neighbor list, and/or an extended neighbor list, some of which are described in additional detail below. Thus, a beacon may include information that is both common (e.g., shared) amongst several devices and specific to a given device.

In some aspects, a STA (e.g., STA 114) may be required to associate with the AP 104 in order to send communications to and/or to receive communications from the AP 104. In one aspect, information for associating is included in a beacon broadcast by the AP 104. To receive such a beacon, the STA 114 may, for example, perform a broad coverage search over a coverage region. A search may also be performed by the STA 114 by sweeping a coverage region in a lighthouse fashion, for example. After receiving the information for associating, the STA 114 may transmit a reference signal, such as an association probe or request, to the AP 104. In some aspects, the AP 104 may use backhaul services, for example, to communicate with a larger network, such as the Internet or a public switched telephone network (PSTN).

In an aspect, the AP 104 may include one or more components for performing various functions. For example, the AP 104 may include a feedback component 124 configured to receive channel feedback from a second wireless device (e.g., a STA). The feedback component 124 may be configured to determine a frame size based on the received channel feedback for transmitting a frame to the second wireless device. The feedback component 124 may be configured to transmit the frame to the second wireless device based on the determined frame size. In an aspect, the frame size may refer to the size of a physical layer convergence procedure (PLCP) protocol data unit (PPDU) size.

In another aspect, the STA 114 may include one or more components for performing various functions. For example, the STA 114 may include a feedback component 126 configured to receive channel feedback from a second wireless device (e.g., an AP or another STA). The feedback component 126 may be configured to determine a frame size based on the received channel feedback for transmitting a frame to the second wireless device. The feedback component 126 may be configured to transmit the frame to the second wireless device based on the determined frame size.

Wireless devices within a wireless network (e.g., a Wi-Fi network) may transmit feedback information, such as channel feedback information, to other wireless devices within the network to improve data transmission. For example, APs may transmit channel feedback information to STAs. STAs may transmit channel feedback information to APs (e.g., for a WLAN link) and/or other STAs (e.g., for a peer-to-peer link). Channel feedback information (e.g., channel quality information (CQI)) may be used to determine if a channel is bursty. A bursty channel may have periods of good signal-to-interference noise ratios (SINRs) and bad SINRs. For example, if the SINR for a channel is less than a threshold of 5 dB, then the channel exhibits bad SINR. If the SINR for the channel is greater than 25 dB, then the channel exhibits good SINR. However, the quality of a channel may change frequently. If a channel is bursty, it may be beneficial for a transmitter to have up to date channel quality information before choosing an MCS, a transmission time, and/or frame size. In an aspect, the transmitter may want to utilize a lower MCS and/or smaller frame size if channel conditions are poor and may want to utilize a higher MCS and/or larger frame size if channel conditions are good. In another aspect, the transmitter may want to delay transmissions if channel conditions are poor. In an aspect, if good channel conditions are known to be very brief, then the transmitter may want to use short frames if the channel conditions are good. As such, a need exists for improving the way in which channel feedback is collected and reported in order accurately identify periods during which a channel is most likely to exhibit good SINR. Further, a need exists to identify different uses of the received channel feedback information to improve communications.

Figure 2:
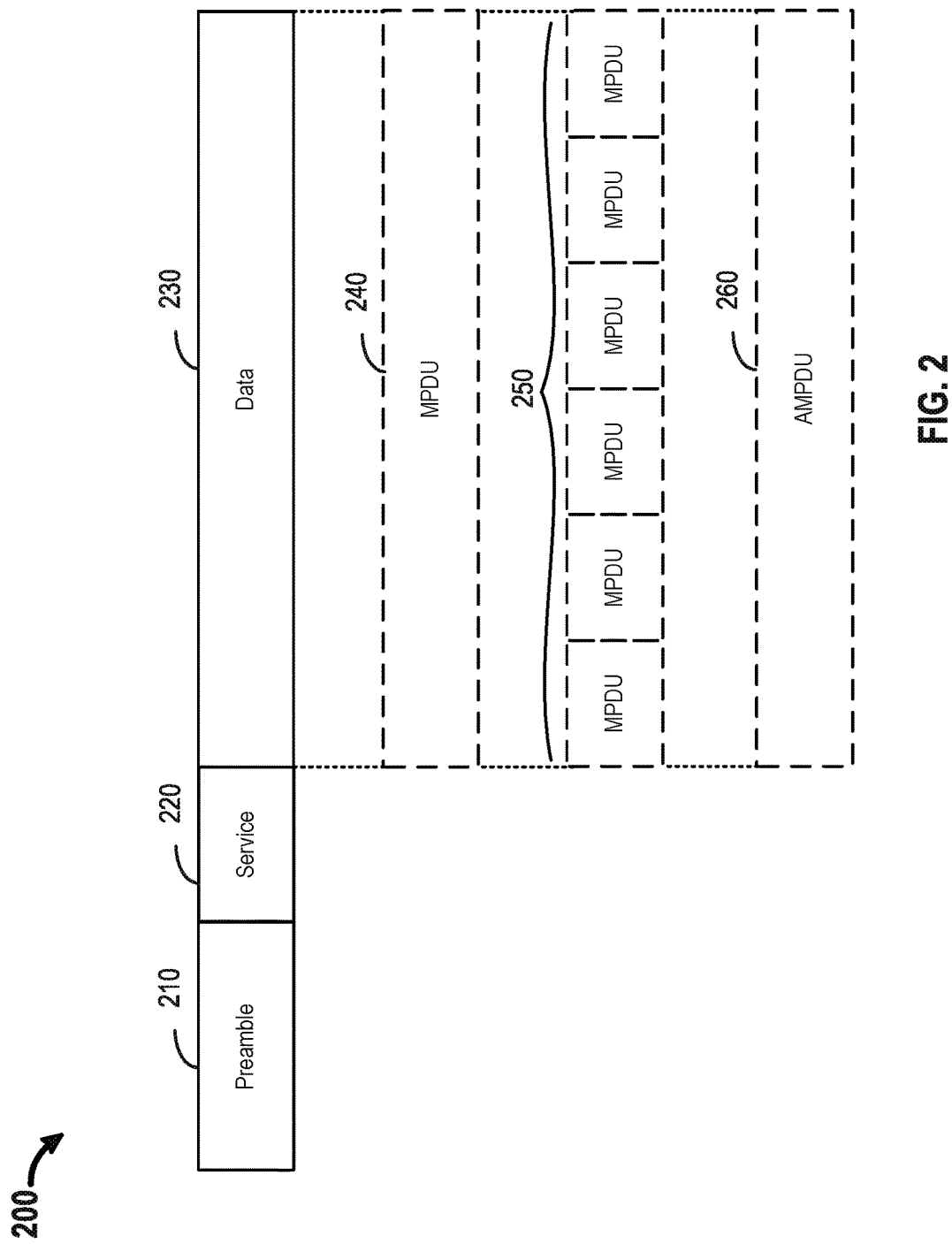
FIG. 2 is a diagram that illustrates a structure of a frame.

FIG. 2 is a diagram that illustrates a structure of a frame 200. STAs (e.g., the STAs 112, 114, 116, 118) and/or APs (e.g., the AP 104) may transmit frames with similar structure. Referring to FIG. 2, the frame 200 may include a preamble 210, a set of service bits 220, and data field 230. The preamble 210 may be considered a header of the frame 200 with information identifying a modulation and coding scheme (MCS), a transmission rate, and/or a length/time duration associated with the frame 200. In aspect, the preamble 210 may include a signal (SIG) field, a short training field (STF), and one or more long training field (LTF) symbols. The SIG field may be used to transfer rate and length information. The STF may be used to improve automatic gain control (AGC) in a multi-transmit and multi-receive system. The LTF symbols may be used to provide information that enables a wireless device receiving the frame 200 to perform channel estimation. The set of service bits 220 may be a set of 16 bits used for control information (e.g., scrambler information). The data field 230 may contain user data to be communicated between the STA 114 and the AP 104, for example.

The data field 230 of the frame 200 may vary in size or length. In one aspect, the data field 230 may include one medium access control (MAC) protocol data unit (MPDU) 240. In this aspect, the frame 200 may have a relatively short length (or time duration) such as 0.5 millisecond (ms). In another aspect, the frame 200 may have a set of MPDUs 250, and the set of MPDUs 250 may include multiple MPDUs (e.g., 6 MPDUs as shown in FIG. 2 or some other number of MPDUs). Each MPDU in the set of MPDUs 250 may include a separate MAC header, payload, and frame check sequence (FCS). In yet another aspect, the frame 200 may have an aggregated MPDU (A-MPDU) 260. The aggregated MPDU 260 may include multiple MPDUs separated by an MPDU delimiter. The MPDU delimiter may be 32-bits in length and enable a receiving device to parse the A-MPDU structure by using the length in each delimiter to extract the following MPDU.

As further discussed below, the frame size/duration may be adjusted based on channel feedback. If the channel feedback indicates that a channel has good quality, then a longer frame (e.g., a frame with more MPDUs) may be transmitted. If the channel feedback indicates that the channel has poor quality, then a shorter frame (e.g., a frame with a single MPDU) may be transmitted.

Figure 3:
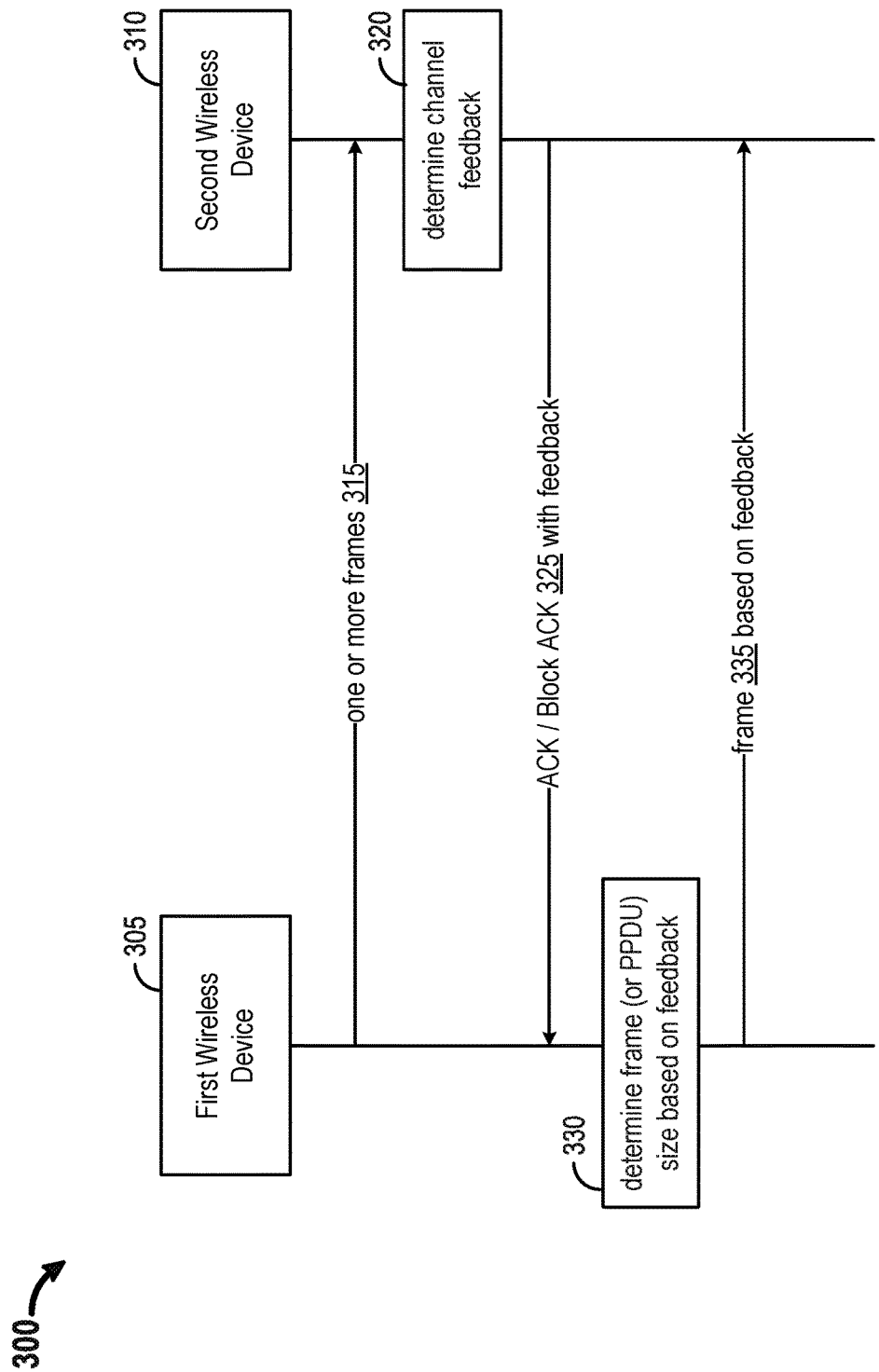
FIG. 3 is a call flow diagram illustrating a method of determining a frame size based on channel feedback in ACK or block ACK frames.

FIG. 3 is a call flow diagram 300 illustrating a method of determining a frame size based on channel feedback in acknowledgement (ACK) or block ACK (BACK) frames. Referring to FIG. 3, a first wireless device 305 may communicate over a connection with a second wireless device 310. In one aspect, the first wireless device 305 may be a STA, and the second wireless device 310 may be an AP, or vice versa. In another aspect, both the first wireless device 305 and the second wireless device 310 may be STAs, and the connection may be a peer-to-peer (P2P) connection.

In this method, the first wireless device 305 may receive channel feedback through ACK frames and/or block ACK frames. Referring to FIG. 3, the first wireless device 305 may transmit one or more frames 315 to the second wireless device 310. Each of the one or more frames 315 may be transmitted at a predetermined MCS and/or have a predetermined length (or time duration) as indicated in a preamble (e.g., the preamble 210). The second wireless device 310 may receive the one or more frames 315 and determine the channel conditions based on whether the one or more frames 315 was successfully received. For example, if 15 frames were transmitted, the second wireless device 310 may determine that the first 5 frames were successfully received, the next 5 frames were not successfully received, and the last 5 frames were successfully received. In another aspect, the second wireless device 310 may measure the SINR (or signal-to-noise ratio (SNR)) for each of the one or more frames 315.

Based on the number of successfully received frames and/or the measured SINR/SNR of each of the frames, the second wireless device may determine 320 channel feedback on the channel(s) on which the one or more frames 315 was transmitted. In one aspect, the channel feedback may include the measured SINR associated with each one of the one or more frames 315 (or subframes) received by the second wireless device 310. In another aspect, the channel feedback may include an average SINR over a period of time for all of the one or more frames 315. In one another aspect, the channel feedback may be pass/fail ACK information. In another aspect, the channel feedback may include one or more recommended MCSs. For example, if the one or more frames 315 was transmitted at MCS 8 but the measured SINR associated with the one or more frames was below a threshold (e.g., 5 dB), then the second wireless device 310 may recommend a lower MCS (e.g., MCS 6). In another example, the recommended MCS may be based on the one or more frames 315 and on a history of measured SINRs of frames received from the first wireless device 305. For example, if the one or more frames 315 was transmitted at MCS 8, but transmission history reveals that the throughput would be better with MCS 4 or 6, then the second wireless device 310 may recommend MCS 4 or 6. In another aspect, the channel feedback may include a variance of measured SINRs within one of the received frames (e.g., across subframes, as a function of frame length) or across multiple received frames (as a function of frame length). In yet another aspect, the channel feedback may include a time duration associated with a received MCS for which the SINR of the received one or more frames 315 was above a threshold. In another aspect, if the second wireless device 310 recommends an MCS to the first wireless device 305, the channel feedback may include a probability that the recommended MCS is the best MCS among other available MCSs (e.g., results in highest SINR compared to other MCSs). In another aspect, the channel feedback may include a probability distribution associated with one or more recommended MCSs. In this aspect, the probability distribution may be a table that links each recommended MCS with a probability that the recommended MCS may result in a highest SINR at the second wireless device 310. In another aspect, the channel feedback may include a time duration that the initial SINR remained relatively constant. In another aspect, the channel feedback may include a time duration associated with one or more recommended MCS (e.g., a time duration for which the recommended MCS is valid). In another aspect, the channel feedback may include an average time duration for which the recommended MCS remains constant In another aspect, the channel feedback may include a variance of recommended MCSs. In this aspect, the variance of recommended MCSs may be provided as a function of frame length/size.

After determining the channel feedback, the second wireless device 310 may transmit the channel feedback in an ACK frame 325 (or block ACK (BACK) frame) associated with the received one or more frames. The first wireless device 305 may receive the ACK/BACK frame and determine 330 a frame size (or PPDU size) for transmitting a frame 335 to the second wireless device 310. By receiving the channel feedback with ACKs or BACKs, the first wireless device 305 may be able to determine a current channel quality, when and how often channel quality changes, and durations for which the channel quality remains constant at various levels. In an aspect, the first wireless device 305 may determine, based on the channel feedback included in the ACKs or BACKs, an expected duration for which a channel quality is greater than a threshold (e.g., duration for which a channel may support a particular MCS at the receiver). In an aspect, the first wireless device 305 may make this determination based on a time duration for which ACKs were received compared to negative ACKs (NACKS). The first wireless device 305 may select a frame size based on the expected duration for which the channel is greater than the threshold. Upon selecting the frame size, the first wireless device 305 may determine a number of MPDUs to include within the frame 335 to be transmitted to the second wireless device 310.

In one example, the first wireless device 305 may transmit 15 frames. Upon receiving the frames, the second wireless device 310 may transmit ACK/BACKs that include channel feedback. The channel feedback may indicate that the first set of 3 frames has good channel quality (e.g., SINR above a threshold), the second set of 3 frames has poor channel quality (e.g., SINR below threshold), the third set of 3 frames has good channel quality, the fourth set of 3 frames has poor channel quality, and the fifth set of 3 frames has good channel quality. The first wireless device 305 may determine based on the ACK/BACKs and the channel feedback that the channel is bursty but may still be feasible for data transmission. If the previously transmitted frame had 15

MPDUs, then the first wireless device 305 may determine that a shorter expected duration (than the an example default of 4 ms) is beneficial. The first wireless device 305 may select a smaller frame size (e.g., 0.5 ms) based on the expected duration. Based on the smaller frame size, the first wireless device 305 may select 5 MPDUs instead of 15 MPDUs to transmit in the frame 335 with the adjusted frame size.

In another example, the first wireless device 305 may transmit 10 frames, each with 1 MPDU. Upon receiving the frames, the second wireless device 310 may transmit ACK/BACKs that include channel feedback. The channel feedback may indicate that of the 10 frames, only 1 frame was received with SINR above 10 dB. The channel feedback may include a recommended MCS 1. The first wireless device 305 may receive the ACK/BACKs and determine a respective SINR for each transmitted frame based on the received channel feedback. The first wireless device may also receive the recommended MCS 1 from the second wireless device 310. In this example, the first wireless device 305 may determine that based on the low SINRs and the inability to reduce the frame size any further, the channel quality is too poor for data transmission even at the recommended MCS 1. Accordingly, the first wireless device 305 may refrain from transmitting until after a period of time has elapsed, or may transmit frames at the recommended MCS 1.

In another example, the first wireless device 305 may transmit 10 frames, each with 4 MPDUs. Upon receiving the frames, the second wireless device 310 may transmit ACK/BACKs that include channel feedback. The channel feedback may indicate that all of the initial MPDUs in the frames were received with SINR above a threshold (e.g., the threshold may be 25 dB). The channel feedback may further include a recommended MCS that is the same as or greater than the MCS as the one previously used for transmission. The first wireless device 305 may receive the ACK/BACKs and determine the respective SINRs for each transmitted frame and the recommended MCS. The first wireless device 305 may determine that the latest channel feedback indicates a good channel, but the overall transmission history associated with the channel indicates that good periods do not last long. Accordingly, the first wireless device 305 may determine to schedule frames with a shorter frame size for transmission (e.g., a frame with 2 MPDUs). On the other hand, if the channel quality is good and previous statistics show that the good channel periods last a long time (e.g., on the order of ms), then the first wireless device 305 may determine to use a longer frame size (e.g., 64 MPDUs).

In another example, if the channel feedback indicates that the channel quality is poor, and the previous history of feedback information shows that the bad periods do not last very long, then the first wireless device 305 may send frames with 1 or 2 MPDUs and wait until the second wireless device 310 transmits feedback that indicates better channel quality before transmitting additional data with longer frame sizes.

In another aspect, the first wireless device 305 may determine the MCS to transmit the frame 335 based on the received channel feedback. The first wireless device 305 may determine the MCS by determining a time period during which a set of MCSs is valid) within a transmission channel. The first wireless device 305 may select an MCS among the set of MCSs based on which MCS is associated with the highest expected throughput.

Subsequently, the first wireless device 305 may transmit the frame 335 to the second wireless device 310 based on the adjusted frame size. The transmission may also be based on an adjusted MCS.

Figure 4:
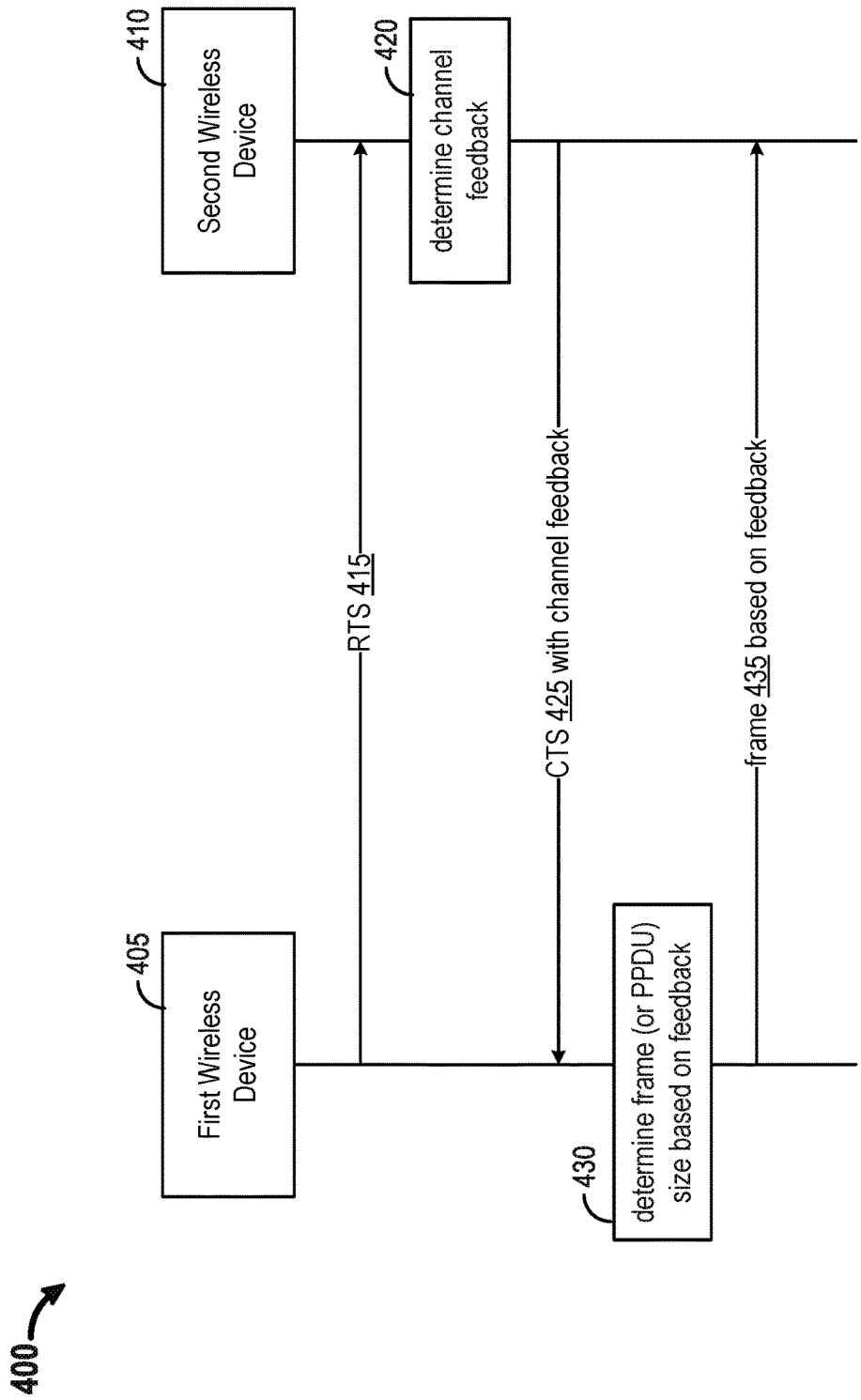
FIG. 4 is a call flow diagram illustrating a method of determining a frame size based on channel feedback using RTS and CTS frames.

FIG. 4 is a call flow diagram 400 illustrating a method of determining a frame size based on channel feedback using request to send (RTS) and clear to send (CTS) frames. Referring to FIG. 4, a first wireless device 405 may communicate over a connection with a second wireless device 410. In one aspect, the first wireless device 405 may be a STA, and the second wireless device 410 may be an AP, or vice versa. In another aspect, both the first wireless device 405 and the second wireless device 410 may be STAs, and the connection may be a P2P connection.

In this method, the first wireless device 405 may have data to transmit to the second wireless device 410. Before transmitting the data, the first wireless device 405 may transmit an RTS frame 415 to the second wireless device 410. The RTS frame 415 may be transmitted at a predetermined MCS. Upon receiving the RTS frame 415, the second wireless device 410 may determine 420 channel feedback based on the received RTS frame 415. The second wireless device 410 may measure the SINR of the received RTS frame 415. In one aspect, the channel feedback may include the measured SINR associated with RTS frame 415 received by the second wireless device 310. In another aspect, the channel feedback may include an average SINR over a period of time for frames previously transmitted by the first wireless device 405 to the second wireless device 410. In another aspect, the channel feedback may include one or more recommended MCSs. For example, if the RTS frame 415 was transmitted at MCS 1 but the measured SINR associated with the RTS frame 415 was above a threshold (e.g., 25 dB), then the second wireless device 410 may recommend a higher MCS (e.g., MCS 8). In another example, the recommended MCS may be based on the RTS frame 415 and a history of measured SINRs of previously received frames from the first wireless device 405. For example, if the RTS frame 415 was transmitted at MCS 8, but transmission history reveals that previous frames transmitted at MCS 4 had a better decode rate, then the second wireless device 410 may recommend MCS 4. In another aspect, the channel feedback may include a variance of measured SINRs from previously transmitted frames/MPDUs. In yet another aspect, the channel feedback may include a time duration of previously received frames for which the SINR was above a threshold. In another aspect, if the second wireless device 410 recommends an MCS to the first wireless device 405, the channel feedback may include a probability that the recommended MCS is the best MCS among other available MCSs In another aspect, the channel feedback may include a probability distribution associated with one or more recommended MCSs. In this aspect, the probability distribution may be a table that links each recommended MCS with a probability that the recommended MCS may result in the best performance. In another aspect, if the RTS frame 415 was sent with a first MCS, the channel feedback may indicate the probability that a second MCS is the best MCS, given that previous transmissions were sent with a third MCS. In another aspect, the channel feedback may include a time duration associated with one or more recommended MCS (e.g., a time duration for which the recommended MCS is valid; that is, the measured SINR are above a threshold). In another aspect, the channel feedback may include an average time duration for which the SINR necessary to maintain a received MCS remains constant and/or an average time duration for which the recommended MCS remains valid. In another aspect, the channel feedback may include a variance of recommended MCSs.

After determining the channel feedback, the second wireless device 410 may transmit the channel feedback in a CTS frame 425 associated with the RTS frame 415. The first wireless device 405 may receive the CTS frame 425 and determine 430 a frame/PPDU size for transmitting a frame 435 to the second wireless device 410. By receiving the channel feedback in the CTS frame 425, the first wireless device 405 may be able to determine a current channel quality, when and how often channel quality changes, and durations for which the channel quality is good or bad. In an aspect, the first wireless device 405 may determine, based on the channel feedback included in the CTS frame 425, an expected duration for which a channel quality is greater than a threshold (e.g., duration for which a channel may support a particular MCS above a particular SINR threshold at the receiver). The first wireless device 405 may select a frame size based on the expected duration for which the channel is greater than the threshold. Upon selecting the frame size, the first wireless device 405 may determine a number of MPDUs to include within the frame to be transmitted to the second wireless device 410.

In one example, the first wireless device 405 may transmit the RTS frame 415 with MCS 1. Upon receiving the RTS frame 415, the second wireless device 410 may transmit the CTS frame 425 that may include channel feedback. The channel feedback may indicate that of the RTS frame 415 was received with SINR below 10 dB. The channel feedback may include a recommended MCS 0. The first wireless device 405 may receive the CTS frame 425 and the recommended MCS 0 from the second wireless device 410. In this example, the first wireless device 405 may determine an expected duration for which the channel may have acceptable channel quality. For example, the first wireless device 405 may determine that the channel has a good enough quality for to support MCS 0 for 10 ms. As such, the first wireless device 405 may select a frame size of 4 ms and determine to include as may MPDUs as possible in the frame 435 to be transmitted to the second wireless device 410 at MCS 4.

In another example, the first wireless device 405 may transmit the RTS frame 415. Upon receiving the RTS frame 415, the second wireless device 410 may transmit the CTS frame 425 that may include channel feedback. The channel feedback may indicate that the RTS frame 415 was received with SINR above a threshold indicating good channel quality (e.g., 25 dB). The channel feedback may further include a recommended MCS that is the same as or greater than the MCS as the one previously used for transmitting the RTS frame 415. The first wireless device 405 may receive the CTS frame 425 and determine to use the recommended MCS. The first wireless device 305 may determine that the latest channel feedback indicates a good channel, but the overall transmission history indicates that good periods do not last long. Accordingly, the first wireless device 405 may determine to schedule the frame 435 with a shorter frame size for transmission (e.g., a frame with 2 MPDUs). On the other hand, if the channel quality is good and previous statistics show that the good channel periods last a long time, then the first wireless device 405 may determine to use a longer frame size (e.g., 64 MPDUs).

In another example, if the channel feedback indicates that the channel quality is poor, and the previous history shows that the bad periods do not last very long, then the first wireless device 405 may send frames with 1 or 2 MPDUs and wait until the second wireless device 410 transmits feedback that indicates better channel quality before transmitting additional data with longer frame sizes.

In another aspect, the first wireless device 405 may determine the MCS to transmit the frame 435 based on the received channel feedback. The first wireless device 405 may determine the MCS by determining a time period during which a set of MCSs is valid (e.g., expected to result in a received frame above a SINR threshold) within a transmission channel. The first wireless device 405 may select an MCS among the set of MCSs based on which MCS is associated with the highest expected throughput given the expected valid time periods.

Subsequently, based on the determined frame size, the first wireless device 405 may transmit the frame 435 to the second wireless device 410 using a frame size determined based on the channel feedback.

Figure 5:
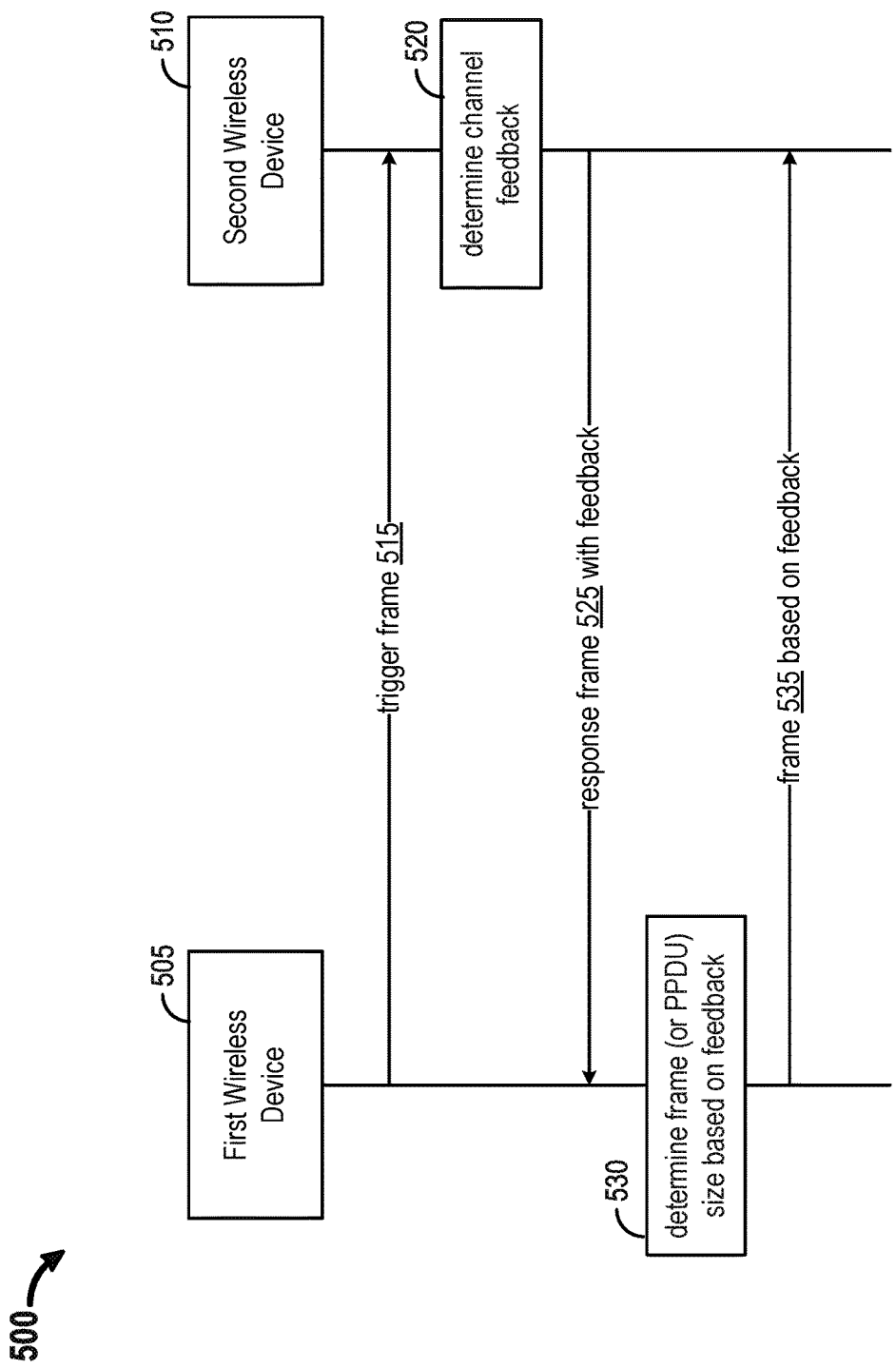
FIG. 5 is a call flow diagram illustrating a method of determining a frame size based channel feedback using trigger and response frames.

FIG. 5 is a call flow diagram 500 illustrating a method of determining a frame size based on channel feedback using trigger and response frames. Referring to FIG. 5, a first wireless device 505 may communicate over a connection with a second wireless device 510. In one aspect, the first wireless device 505 may be a STA, and the second wireless device 510 may be an AP, or vice versa. In another aspect, both the first wireless device 505 and the second wireless device 510 may be STAs, and the connection may be a P2P connection.

In this method, the first wireless device 505 may have data to transmit to the second wireless device 510. Before transmitting the data, the first wireless device 505 may transmit a trigger frame 515 to the second wireless device 510. The trigger frame 515 may be transmitted at a predetermined MCS. Upon receiving the trigger frame 515, the second wireless device 510 may determine 520 channel feedback based on the received trigger frame 515. The second wireless device 510 may measure the SINR of the trigger frame 515. In one aspect, the channel feedback may include the measured SINR associated with trigger frame 515 received by the second wireless device 510. In another aspect, the channel feedback may include an average SINR over a period of time for frames previously transmitted by the first wireless device 505 to the second wireless device 510. In another aspect, the channel feedback may include one or more recommended MCSs. For example, if the trigger frame 515 was transmitted at MCS 8 but the measured SINR associated with the trigger frame 515 was below a threshold (e.g., 5 dB), then the second wireless device 510 may recommend a lower MCS (e.g., MCS 4). In another aspect, the recommended MCS may also be based on the trigger frame 515 and a history of measured SINRs of frames received from the first wireless device 505. For example, if the trigger frame 515 was transmitted at MCS 8, but transmission history reveals that previous frames transmitted at MCS 6 had better packet error rates (PERs), then the second wireless device 510 may recommend MCS 6. In another aspect, the channel feedback may include a variance of measured SINRs within the trigger frame 515 and/or one of a previously transmitted frame (e.g., across subframes) and/or across multiple transmitted frames from the first wireless device 505. In yet another aspect, the channel feedback may include a time duration associated with an MCS for which the MCS is expected to remain valid (e.g., packets sent at that MCS would be decodable for a given amount of time). In another aspect, if the second wireless device 510 recommends an MCS to the first wireless device 505, the channel feedback may include a probability that the recommended MCS is the best MCS among other available MCSs. In another aspect, the channel feedback may include a probability distribution associated with one or more recommended MCSs. In this aspect, the probability distribution may be a table that links each recommended MCS with a probability that the recommended MCS may result in a better PER. In another aspect, the channel feedback may include a time duration associated with one or more recommended MCS (e.g., a time duration for which the recommended MCS is valid). In another aspect, the channel feedback may include an average time duration for which the received MCS remains constant (e.g., a time duration for which the MCS would result in measured PERs below a threshold). In another aspect, the channel feedback may include a variance of recommended MCSs.

After determining the channel feedback, the second wireless device 510 may transmit the channel feedback in a response frame 525 associated with the trigger frame 515. The first wireless device 505 may receive the response frame 525 and determine 530 a frame/PPDU size for transmitting a frame 535 to the second wireless device 510. By receiving the channel feedback in the response frame 525, the first wireless device 505 may be able to determine a current channel quality, when and how often channel quality changes, and durations for which the channel quality is good or bad. In an aspect, the first wireless device 505 may determine, based on the channel feedback included in the response frame 525, an expected duration for which a channel quality is greater than a threshold (e.g., duration for which a channel may support a particular MCS). The first wireless device 505 may select a frame size based on the expected duration for which the channel is greater than the threshold. Upon determining the frame size, the first wireless device 505 may determine a number of MPDUs to include within the frame to be transmitted to the second wireless device 510.

In one example, the first wireless device 505 may transmit the trigger frame 515 with MCS 0. Upon receiving the trigger frame 515, the second wireless device 510 may transmit the response frame 525 that may include channel feedback. The channel feedback may indicate that the trigger frame 515 was received with SINR below 10 dB. The channel feedback may include a recommended MCS 1. The first wireless device 505 may receive the response frame 525 and the recommended MCS 1 from the second wireless device 510. In this example, the first wireless device 505 may determine an expected duration for which the channel may support MCS 1. For example, the first wireless device 505 may determine that the channel may support MCS 1 for 10 ms. As such, the first wireless device 505 may select a frame size of 4 ms and determine to include as many MPDUs as possible in the frame 535 to be transmitted to the second wireless device 510 at MCS 4.

In another example, the first wireless device 505 may transmit the trigger frame 515. Upon receiving the trigger frame 515, the second wireless device 510 may transmit the response frame 525 that may include channel feedback. The channel feedback may indicate that the trigger frame 515 was received with SINR above a threshold indicating good channel quality (e.g., 25 dB). The channel feedback may further include a recommended MCS that is the same as or greater than the MCS as the one previously used for transmitting the trigger frame 515. The first wireless device 505 may receive the response frame 525 and determine to use the recommended MCS. The first wireless device 505 may determine that the latest channel feedback indicates a good channel, but the overall transmission history indicates that good periods do not last long. Accordingly, the first wireless device 505 may determine to schedule the frame 535 with a shorter frame size for transmission). On the other hand, if the channel quality is good and previous statistics show that the good channel periods last a long time, then the first wireless device 505 may determine to use a longer frame size (e.g., 4 ms).

In another example, if the channel feedback indicates that the channel quality is poor, and the previous history shows that the bad periods do not last very long, then the first wireless device 505 may send frames with 1 or 2 MPDUs and wait until the second wireless device 510 transmits feedback that indicates better channel quality before transmitting additional data with longer frame sizes.

In another aspect, the first wireless device 505 may determine the MCS to transmit the frame 535 based on the received channel feedback. The first wireless device 505 may determine the MCS by determining a time period during which a set of MCSs is valid within a transmission channel. The first wireless device 505 may select an MCS among the set of MCSs based on which MCS is associated with the highest expected throughput given the expected valid time periods.

In another aspect, the first wireless device 505 and the second wireless device 510 may be engaged in a sounding procedure to initiate beam forming. The first and second wireless devices 505, 510 may employ a null data packet (NDP) sounding procedure. The first wireless device 505 may be the beamformer and the second wireless device 510 may be the beamformee. In this process, the beamformer may transmit an NDP announcement frame to gain control of the channel and identify beamformees. Beamformees may respond to the NDP announcement. The beamformer may follow the NDP announcement with a null data packet. Based on the NDP, the beamformee may calculate the channel response/feedback matrix. The beamformee may also calculate or measure the above-mentioned forms of channel feedback information and transmit the feedback matrix and channel feedback (e.g., SINR, recommended MCS, durations that MCSs would be valid, etc.) to the beamformer. The beamformer may utilize the received channel feedback to adjust the frame size and/or MCS for transmitting subsequent frames. In another aspect, the first wireless device 505 and the second wireless device 510 may use a short sounding procedure to transmit feedback information. That is, the first wireless device 505 may ask the second wireless device 510 to send a compressed or reduced set of information that may not include all the beam forming information but includes the channel feedback information for adjusting frame size (e.g., no feedback matrix but includes recommended MCS).

In another aspect, the channel feedback may be included a control field (e.g., a high throughput (HT or HE) control field) of a frame. The control field may be sent in a frame with data (e.g., in a quality of service frame). In another aspect, the control field may be included in a control frame if a control wrapper is used. In another aspect, the control field may be sent in a stand-alone frame.

Figure 6:
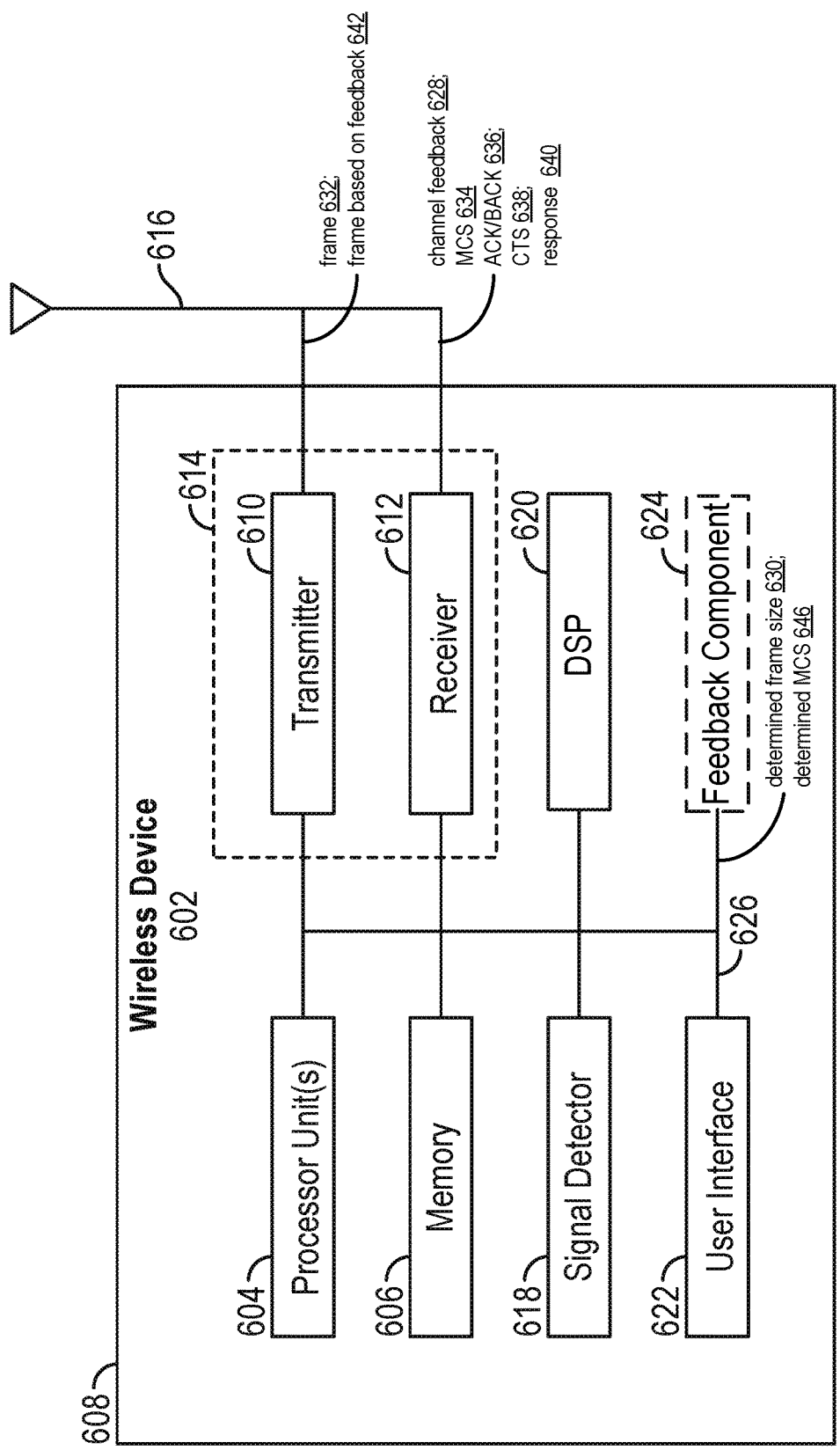
FIG. 6 is a functional block diagram of a wireless device that may be employed within the wireless communication system of FIG. 1 for determining a frame size based on channel feedback.

FIG. 6 is a functional block diagram of a wireless device 602 that may be employed within the wireless communication system 100 of FIG. 1 for determining a frame size based on channel feedback. The wireless device 602 is an example of a device that may be configured to implement the various methods described herein. For example, the wireless device 602 may be the AP 104, the STAs 112, 114, 116, 118, the first wireless devices 305, 405, 505, or the second wireless devices 310, 410, 510.

The wireless device 602 may include a processor 604 which controls operation of the wireless device 602. The processor 604 may also be referred to as a central processing unit (CPU). Memory 606, which may include both read-only memory (ROM) and random access memory (RAM), may provide instructions and data to the processor 604. A portion of the memory 606 may also include non-volatile random access memory (NVRAM). The processor 604 typically performs logical and arithmetic operations based on program instructions stored within the memory 606. The instructions in the memory 606 may be executable (by the processor 604, for example) to implement the methods described herein.

The processor 604 may comprise or be a component of a processing system implemented with one or more processors. The one or more processors may be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that can perform calculations or other manipulations of information.

The processing system may also include machine-readable media for storing software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, cause the processing system to perform the various functions described herein.

The wireless device 602 may also include a housing 608, and the wireless device 602 may include a transmitter 610 and/or a receiver 612 to allow transmission and reception of data between the wireless device 602 and a remote device. The transmitter 610 and the receiver 612 may be combined into a transceiver 614. An antenna 616 may be attached to the housing 608 and electrically coupled to the transceiver 614. The wireless device 602 may also include multiple transmitters, multiple receivers, multiple transceivers, and/or multiple antennas.

The wireless device 602 may also include a signal detector 618 that may be used to detect and quantify the level of signals received by the transceiver 614 or the receiver 612. The signal detector 618 may detect such signals as total energy, energy per subcarrier per symbol, power spectral density, and other signals. The wireless device 602 may also include a DSP 620 for use in processing signals. The DSP 620 may be configured to generate a packet for transmission. In some aspects, the packet may comprise a PPDU.

The wireless device 602 may further comprise a user interface 622 in some aspects. The user interface 622 may comprise a keypad, a microphone, a speaker, and/or a display. The user interface 622 may include any element or component that conveys information to a user of the wireless device 602 and/or receives input from the user.

When the wireless device 602 is implemented as an AP (e.g., AP 104) or as a STA (e.g., the STA 114), the wireless device 602 may also include a feedback component 624. The feedback component 624 may be configured to receive channel feedback (e.g., channel feedback 628) from a second wireless device. The feedback component 624 may be configured to determine a frame size (e.g., determined frame size 630) based on the received channel feedback for transmitting a frame (e.g., frame based on feedback 642) to the second wireless device. The feedback component 624 may be configured to transmit the frame to the second wireless device based on the determined frame size. In one configuration, the feedback component 624 may be configured to transmit at least one frame (e.g., frame 632) to the second wireless device and to receive an ACK frame (e.g., ACK frame 636) or block ACK frame from the second wireless device based on the transmitted at least one frame. In this configuration, the ACK frame or block ACK frame may include the channel feedback. In another configuration, the feedback component 624 may be configured to transmit an RTS frame to the second wireless device and to receive a CTS frame (e.g., CTS frame 638) from the second wireless device. In this configuration, the channel feedback may be received in the CTS frame. In another configuration, the channel feedback may be received during a sounding procedure (or based on a sounding procedure). In yet another configuration, the feedback component 624 may be configured to transmit a trigger frame to the second wireless device and to receive a response frame (e.g., response frame 640) from the second wireless device based on the transmitted trigger frame. In this configuration, the channel feedback may be received in the response frame. In an aspect, the received channel feedback may include a SINR associated with one or more frames or subframes received by the second wireless device from the wireless device 602, a recommended MCS (e.g., MCS 634), a variance of SINRs within a second frame or across multiple frames, and/or a time duration associated with a received MCS. In another aspect, the received channel feedback may further include a probability associated with the recommended MCS, a probability distribution associated with the recommended MCS, a time duration associated with the recommended MCS, an average time duration for which the recommended MCS or the received MCS remains constant, and/or a variance of recommended MCSs. In another configuration, the feedback component 624 may be configured to determine the frame size by determining, based on the received channel feedback, an expected duration for which a channel quality is greater than a threshold and by selecting the frame size based on the determined expected duration for which the channel quality is greater than the threshold. In an aspect, the expected duration may be further based on a history of received channel feedback information. In this configuration, the feedback component 624 may also be configured to determine the frame size by determining a number of MPDUs to include within the frame for transmission to the second wireless device based on the determined expected duration and the selected frame size. In another configuration, the feedback component 624 may be configured to determine an MCS (e.g., determined MCS 646) for transmitting the frame based on the received channel feedback. In this configuration, the feedback component 624 may be configured to determine the MCS by determining a time period during which one or more MCSs is valid within a transmission channel and by selecting the MCS based on which of the one or more MCSs is associated with a highest expected throughput given the expected valid time periods.

The various components of the wireless device 602 may be coupled together by a bus system 626. The bus system 626 may include a data bus, for example, as well as a power bus, a control signal bus, and a status signal bus in addition to the data bus. Components of the wireless device 602 may be coupled together or accept or provide inputs to each other using some other mechanism.

Although a number of separate components are illustrated in FIG. 6, one or more of the components may be combined or commonly implemented. For example, the processor 604 may be used to implement not only the functionality described above with respect to the processor 604, but also to implement the functionality described above with respect to the signal detector 618, the DSP 620, the user interface 622, and/or the feedback component 624. Further, each of the components illustrated in FIG. 6 may be implemented using a plurality of separate elements.

Figure 7:
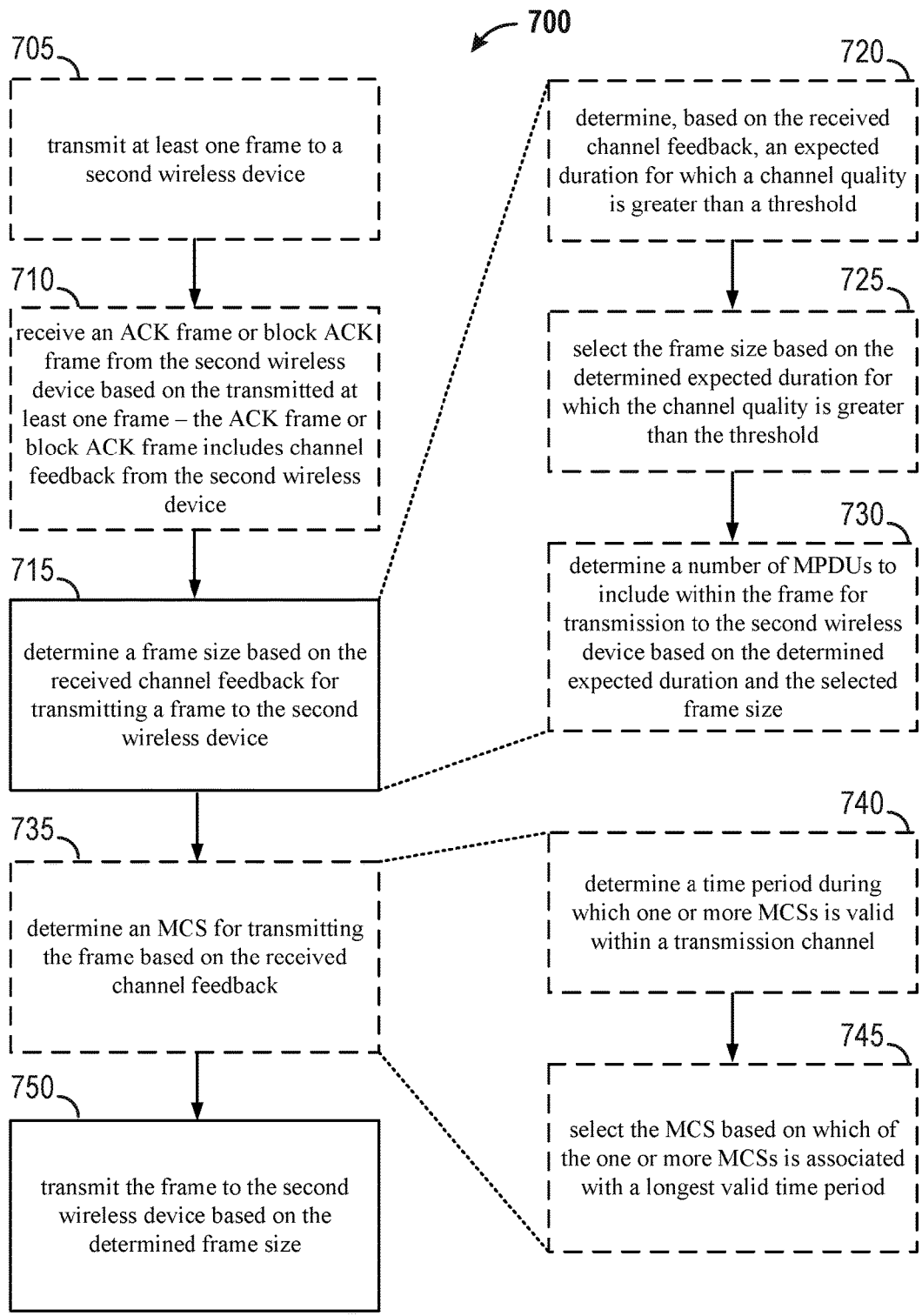
FIG. 7 is a flowchart of an exemplary method of determining a frame size based on channel feedback in ACK or block ACK frames.

FIG. 7 is a flowchart of an exemplary method 700 of determining a frame size based on channel feedback in ACK or block ACK frames. The method 700 may be performed using an apparatus (e.g., the AP 104, the STA 114, the first wireless device 305, or the wireless device 602, for example). Although the method 700 is described below with respect to the elements of wireless device 602 of FIG. 6, other components may be used to implement one or more of the steps described herein. In FIG. 7, blocks denoted with dotted lines indicate optional operations.

At block 705, an apparatus may transmit at least one frame to a second wireless device. For example, referring to FIG. 3, the apparatus may correspond to the first wireless device 305, and the second wireless device may correspond to the second wireless device 310. The first wireless device 305 may transmit one or more frames 315 to the second wireless device 310.

At block 710, the apparatus may receive an ACK frame or block ACK frame from the second wireless device based on the transmitted at least one frame. The ACK frame or block ACK frame may include channel feedback from the second wireless device. In an aspect, the channel feedback may include a SINR associated with one or more frames or subframes received by the second wireless device from the apparatus, a recommended MCS, a variance of SINRs within a second frame or across multiple frames, a time duration associated with a received MCS (e.g., the MCS used to transmit the at least one or more frames), a probability associated with the recommended MCS, a probability distribution associated with the recommended MCS, a time duration associated with the recommended MCS, an average time duration for which the recommended MCS or the received MCS remains constant, and/or a variance of recommended MCSs. For example, referring to FIG. 3, the first wireless device 305 may receive the ACK frame 325 (or block ACK frame) from the second wireless device 310. The ACK frame 325 may include channel feedback from the second wireless device 310 that is based on the one or more frames 315 transmitted to the second wireless device 310. The channel feedback may include measured SINRs associated with each of the one or more frames 315.

At block 715, the apparatus may determine a frame size based on the received channel feedback for transmitting a frame to the second wireless device. In one configuration, the apparatus may determine the frame size by determining, based on the received channel feedback, an expected duration for which a channel quality is greater than a threshold (at block 720), by selecting the frame size based on the determined expected duration for which the channel quality is greater than the threshold (at block 725), and by determining a number of MPDUs to include within the frame for transmission to the second wireless device based on the determined expected duration and the selected frame size (at block 730). In an aspect, the expected duration may be determined based on a history of received channel feedback information. For example, referring to FIG. 3, the first wireless device 305 may determine the frame size based on the measured SINRs for each of the one or more frames 315 and on the recommended MCS. In an aspect, if ACK frames are transmitted, each ACK frame may include a recommended MCS. In another aspect, if a block ACK frame is transmitted, then the block ACK frame may include a bitmap with SINRs for each of the received MPDUs (or may include a single SINR based on all of the received frames). The measured SINRs may average 20 dB and the recommended MCSs may be 4-6. Based on this feedback information, the first wireless device 305 may determine that the channel quality is good. The previously received channel feedback history may also indicate that the connection typically experiences long periods of good channel quality. Accordingly, the first wireless device 305 may determine that the expected duration in which channel quality is greater than 20 dB will be at least 10 ms. The first wireless device 305 may determine to use a longer frame size (e.g., 4 ms) based on the expected duration for which the channel quality is expected to support 20 dB SINRs. Based on the 10 milliseconds for which the channel quality is expected to be greater than 20 dB and the 4 ms frame duration, the first wireless device 305 may determine to include as many MPDUs as can fit in 4 ms in the frame 335 to be transmitted to the second wireless device 310.

At block 735, the apparatus may determine an MCS for transmitting the frame based on the received channel feedback. In one configuration, the apparatus may determine the MCS by determining the recommended MCS received from the second wireless device and by selecting the MCS based on the recommended MCS. In another configuration, the apparatus may determine the MCS by determining a time period during which one or more MCSs is valid within a transmission channel (at block 740) and by selecting the MCS based on which of the one or more MCSs is associated with a highest expected throughput given the expected valid time periods (at block 745). In one example, referring to FIG. 3, the first wireless device 305 may determine the MCS for transmitting the frame 335 based on the measured SINRS and/or the recommended MCS. The first wireless device 305 may use the recommended MCS for transmitting the frame 335. In another example, based on the received feedback, the first wireless device 305 may determine a time period during which one or more MCSs is valid within a transmission channel (e.g., expected to result in messages transmitted with SINR above a threshold) and select the MCS based on which of the one or more MCSs is associated with a longest valid time period. In another example, the first wireless device 305 may choose the MCS and PPDU size based on which combination of MCS and PPDU size will successfully transmit the most bits.

At block 750, the apparatus may transmit the frame to the second wireless device based on the determined frame size. For example, referring to FIG. 3, the first wireless device 305 may transmit the frame 335 to the second wireless device 310 based on the determined frame size (or PPDU size).

Figure 8:
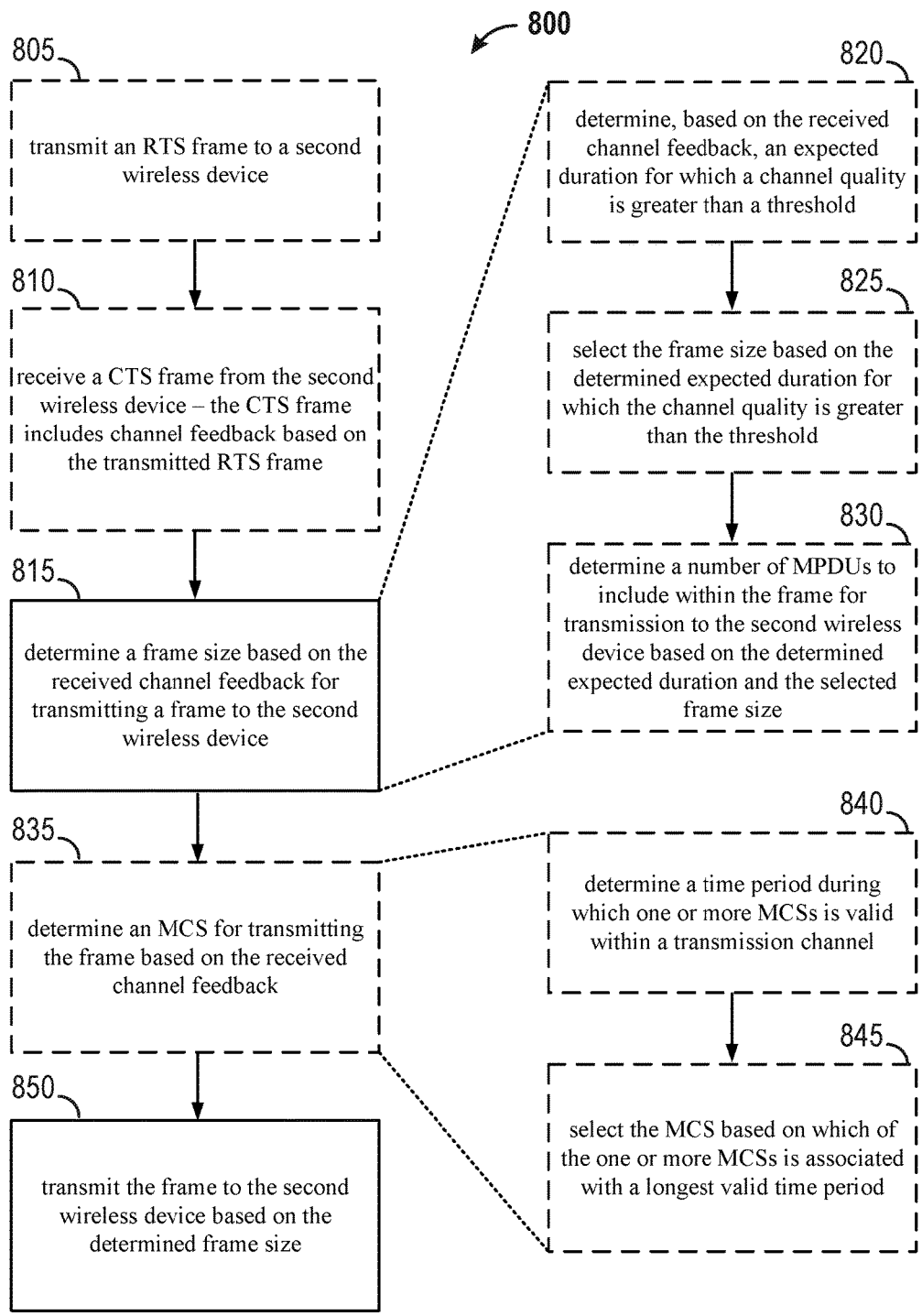
FIG. 8 is a flowchart of an exemplary method of determining a frame size based on channel feedback in CTS frames.

FIG. 8 is a flowchart of an exemplary method 800 of determining a frame size based on channel feedback in CTS frames. The method 800 may be performed using an apparatus (e.g., the AP 104, the STA 114, the first wireless device 405, or the wireless device 602, for example). Although the method 800 is described below with respect to the elements of wireless device 602 of FIG. 6, other components may be used to implement one or more of the steps described herein. In FIG. 8, blocks denoted with dotted lines indicate optional operations.

At block 805, an apparatus may transmit an RTS frame to a second wireless device. For example, referring to FIG. 4, the apparatus may correspond to the first wireless device 405 and the second wireless device may correspond to the second wireless device 410. The first wireless device 405 may transmit an RTS frame 415 to the second wireless device 410.

At block 810, the apparatus may receive a CTS frame from the second wireless device. The CTS frame may include channel feedback based on the transmitted RTS frame. In an aspect, the channel feedback may include a SINR associated with the RTS frame received by the second wireless device from the apparatus, a recommended MCS, a variance of SINRs across multiple frames previously transmitted by the apparatus, a time duration associated with a received MCS (e.g., the MCS used to transmit the at least one or more frames), a probability associated with the recommended MCS, a probability distribution associated with the recommended MCS, a time duration associated with the recommended MCS, an average time duration for which the recommended MCS or the received MCS remains constant, and/or a variance of recommended MCSs. For example, referring to FIG. 4, the first wireless device 405 may receive the CTS frame 425 from the second wireless device 410. The CTS frame may include channel feedback based on the RTS frame 415. The channel feedback may include a recommended MCS.

At block 815, the apparatus may determine a frame size based on the received channel feedback for transmitting a frame to the second wireless device. In one configuration, the apparatus may determine the frame size by determining, based on the received channel feedback, an expected duration for which a channel quality is greater than a threshold (at block 820), by selecting the frame size based on the determined expected duration for which the channel quality is greater than the threshold (at block 825), and by determining a number of MPDUs to include within the frame for transmission to the second wireless device based on the determined expected duration and the selected frame size (at block 830). In an aspect, the expected duration may be determined based on a history of received channel feedback information. For example, referring to FIG. 4, the first wireless device 405 may determine the frame size based on the recommended MCS received in the CTS frame 425. The recommended MCS may indicate an MCS 2. Based on this feedback information, the first wireless device 405 may determine that the channel quality is poor (e.g., an MCS greater than or equal to 5 may indicate good channel quality). Additionally, the first wireless device 405 may determine that the expected duration in which channel quality is poor is only about 1 ms. The first wireless device 305 may determine to use a shorter frame size (e.g., 1 ms) based on the expected duration for which the channel quality is expected to remain poor. Based on the 1 ms for which the channel quality is expected to remain poor and the 1 ms frame duration, the first wireless device 405 may determine to include 1 MPDU in the frame 435 to be transmitted to the second wireless device 410 and attempt to transmit longer frames later when channel quality improves.

At block 835, the apparatus may determine an MCS for transmitting the frame based on the received channel feedback. In one configuration, the apparatus may determine the MCS by determining the recommended MCS received from the second wireless device and by selecting the MCS based on the recommended MCS. In another configuration, the apparatus may determine the MCS by determining a time period during which one or more MCSs is valid within a transmission channel (at block 840) and by selecting the MCS based on which of the one or more MCSs is associated with a longest valid time period (at block 845). In one example, referring to FIG. 4, the first wireless device 405 may determine the MCS for transmitting the frame 435 based on the measured SINRS and/or the recommended MCS. The first wireless device 405 may use the recommended MCS for transmitting the frame 435. In another example, based on the received feedback, the first wireless device 405 may determine a time period during which one or more MCSs is valid within a transmission channel (e.g., expected to result in messages transmitted with SINR above a threshold) and select the MCS based on which of the MCS and PPDU duration combinations has the maximum expected number of successfully transmitted bits.

At block 850, the apparatus may transmit the frame to the second wireless device based on the determined frame size. For example, referring to FIG. 4, the first wireless device 405 may transmit the frame 435 to the second wireless device 410 based on the determined frame size (or PPDU size).

Figure 9:
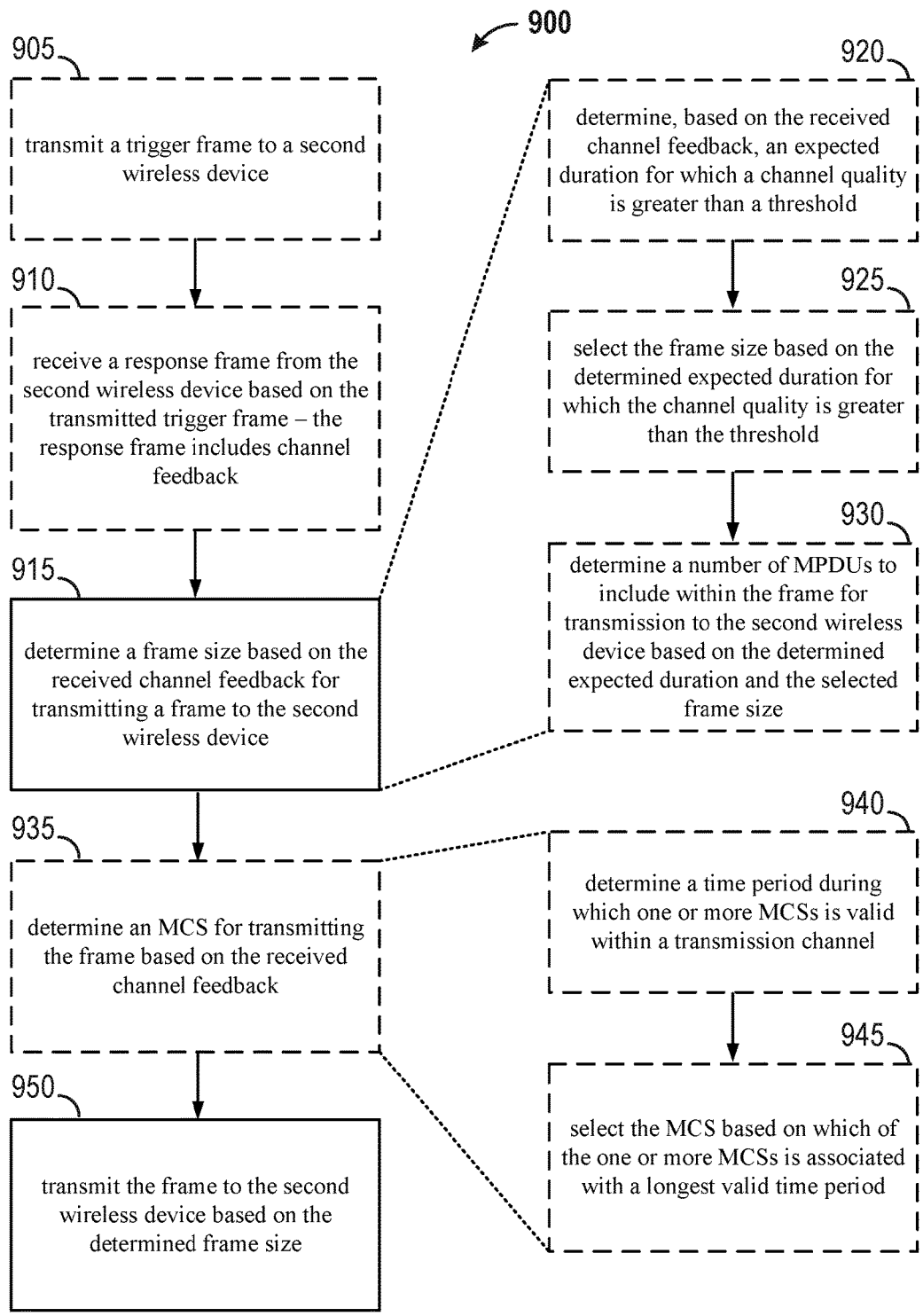
FIG. 9 is a flowchart of an exemplary method of determining a frame size based on channel feedback using trigger and response frames.

FIG. 9 is a flowchart of an exemplary method 900 of determining a frame size based on channel feedback using trigger and response frames. The method 900 may be performed using an apparatus (e.g., the AP 104, the STA 114, the first wireless device 505, or the wireless device 602, for example). Although the method 900 is described below with respect to the elements of wireless device 602 of FIG. 6, other components may be used to implement one or more of the steps described herein. In FIG. 9, blocks denoted with dotted lines indicate optional operations.

At block 905, an apparatus may transmit a trigger frame to a second wireless device. For example, referring to FIG. 5, the apparatus may be the first wireless device 505, and the second wireless device may be the second wireless device 510. The first wireless device 505 may transmit the trigger frame 515 to the second wireless device 510.

At block 910, the apparatus may receive a response frame from the second wireless device based on the transmitted trigger frame. The response frame may include channel feedback. In an aspect, the channel feedback may include a SINR associated with the trigger frame received by the second wireless device from the apparatus, a recommended MCS, a variance of SINRs within the trigger frame or across multiple frames previously transmitted by the apparatus, a time duration associated with a received MCS (e.g., the MCS used to transmit the at least one or more frames), a probability associated with the recommended MCS, a probability distribution associated with the recommended MCS, a time duration associated with the recommended MCS, an average time duration for which the recommended MCS or the received MCS remains constant, and/or a variance of recommended MCSs. For example, referring to FIG. 5, the first wireless device 505 may receive the response frame 525 from the second wireless device 510 based on the trigger frame 515. The response frame 525 may include channel feedback such as a recommended MCS.

At block 915, the apparatus may determine a frame size based on the received channel feedback for transmitting a frame to the second wireless device. In one configuration, the apparatus may determine the frame size by determining, based on the received channel feedback, an expected duration for which a channel quality is greater than a threshold (at block 920), by selecting the frame size based on the determined expected duration for which the channel quality is greater than the threshold (at block 925), and by determining a number of MPDUs to include within the frame for transmission to the second wireless device based on the determined expected duration and the selected frame size (at block 930). In an aspect, the expected duration may be determined based on a history of received channel feedback information. For example, referring to FIG. 5, the first wireless device 505 may determine the frame size based on the recommended MCS received in the response frame 525. The recommended MCS may indicate an MCS 8. Based on this feedback information, the first wireless device 505 may determine that the channel quality is good (e.g., an MCS greater than or equal to 5 may indicate good channel quality). Additionally, the first wireless device 505 may determine that the expected duration in which channel quality is greater than 20 dB may be 10 ms. The first wireless device 505 may determine to use a longer frame size (e.g., 3 ms) based on the expected duration for which the channel quality is expected to support 20 dB SINRs. Based on the 10 ms for which the channel quality is expected to be greater than 20 dB and the 3 ms frame duration, the first wireless device 505 may determine to include 64 MPDUs in the frame 535 to be transmitted to the second wireless device 510.

At block 935, the apparatus may determine an MCS for transmitting the frame based on the received channel feedback. In one configuration, the apparatus may determine the MCS by determining the recommended MCS received from the second wireless device and by selecting the MCS based on the recommended MCS. In another configuration, the apparatus may determine the MCS by determining a time period during which one or more MCSs is valid within a transmission channel (at block 940) and by selecting the MCS based on which of the one or more MCSs and its corresponding duration is expected to result in the maximum amount of bits transferred successfully (at block 945). In one example, referring to FIG. 5, the first wireless device 505 may determine the MCS for transmitting the frame 535 based on the recommended MCS. The first wireless device 505 may use the recommended MCS for transmitting the frame 535. In another example, based on the received feedback, the first wireless device 505 may determine a time period during which one or more MCSs is valid within a transmission channel (e.g., expected to result in messages transmitted with SINR above a threshold) and select the MCS based on which of the one or more MCSs is expected to result in the maximum number of successful bits transferred.

At block 950, the apparatus may transmit the frame to the second wireless device based on the determined frame size. For example, referring to FIG. 5, the first wireless device 505 may transmit the frame 535 to the second wireless device 510 based on the determined frame size (or PPDU size).

Figure 10:
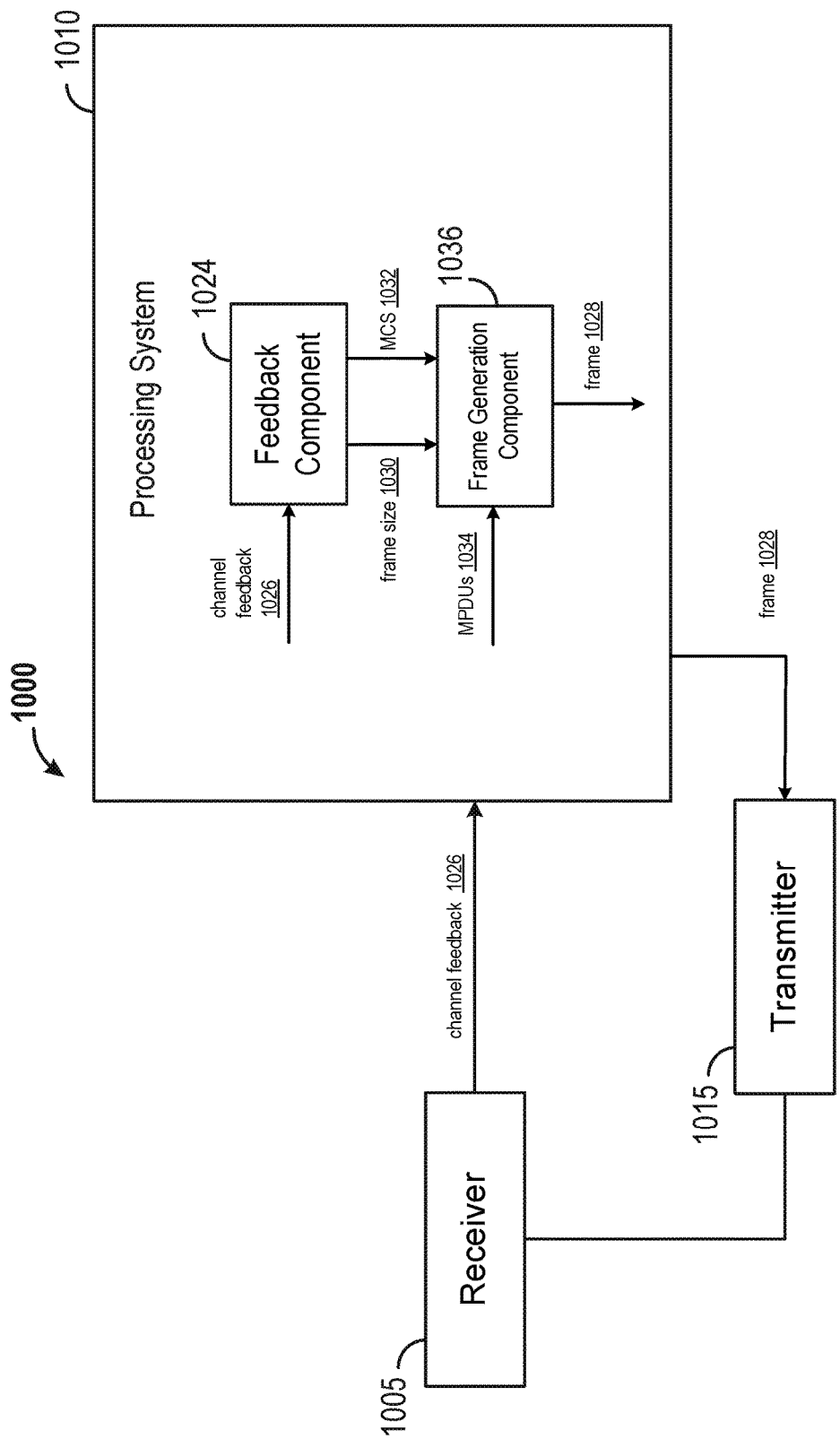
FIG. 10 is a functional block diagram of an exemplary wireless communication device for modifying a frame size based on channel feedback.

FIG. 10 is a functional block diagram of an exemplary wireless communication device 1000 for modifying a frame size based on channel feedback. The wireless communication device 1000 may include a receiver 1005, a processing system 1010, and a transmitter 1015. The processing system 1010 may include a feedback component 1024 and/or a frame generation component 1036. The processing system 1010, the feedback component 1024, and/or the receiver 1005 may be configured to receive channel feedback (e.g., channel feedback 1026) from a second wireless device. The processing system 1010 and/or the feedback component 1024 may be configured to determine a frame size (e.g., a frame size 1030) based on the received channel feedback for transmitting a frame (e.g., a frame 1028) to the second wireless device. The processing system 1010, the feedback component 1024, the frame generation component 1036, and/or the transmitter 1015 may be configured to transmit the frame to the second wireless device based on the determined frame size. In one configuration, the processing system 1010, the feedback component 1024, and/or the transmitter 1015 may be configured to transmit at least one frame to the second wireless device. In this configuration, the processing system 1010, the feedback component 1024, and/or the receiver 1005 may be configured to receive an ACK frame or a block ACK frame from the second wireless device based on the transmitted at least one frame. The ACK frame or the block ACK frame may include the channel feedback. In another configuration, the processing system 1010, the feedback component 1024, and/or the transmitter 1015 may be configured to transmit an RTS frame to the second wireless device. In this configuration, the processing system 1010, the feedback component 1024, and/or the receiver 1005 may be configured to receive a CTS frame from the second wireless device. In this configuration, the channel feedback may be received in the CTS frame. In an aspect, the channel feedback may be received during a sounding procedure. In another configuration, the processing system 1010, the feedback component 1024, and/or the transmitter 1015 may be configured to transmit a trigger frame to the second wireless device. In this configuration, the processing system 1010, the feedback component 1024, and/or the receiver 1005 may be configured to receive a response frame from the second wireless device based on the transmitted trigger frame. In this configuration, the channel feedback may be received in the response frame. In another aspect, the received channel feedback may include a SINR associated with one or more frames or subframes received by the second wireless device from the wireless communication device 1000, a recommended MCS, a variance of SINRs within a second frame or across multiple frames, a time duration associated with a received MCS, a probability associated with the recommended MCS, a probability distribution associated with the recommended MCS, a time duration associated with the recommended MCS, an average time duration for which the recommended MCS or the received MCS remains constant, and/or a variance of recommended MCSs. In another configuration, the processing system 1010 and/or the feedback component 1024 may be configured to determine the frame size by determining, based on the received channel feedback, an expected duration for which a channel quality is greater than a threshold and by selecting the frame size based on the determined expected duration for which the channel quality is greater than the threshold. In an aspect, the expected duration may be further based on a history of received channel feedback information. In this configuration, the processing system 1010 and/or the feedback component 1024 may be further configured to determine a number of MPDUs (e.g., MPDUs 1034) to include within the frame for transmission to the second wireless device based on the determined expected duration and the selected frame size. In another configuration, the processing system 1010 and/or the feedback component 1024 may be configured to determine an MCS (e.g., MCS 1032) for transmitting the frame based on the received channel feedback. In this configuration, the processing system 1010 and/or the feedback component 1024 may be configured to determine the MCS by determining a time period during which one or more MCSs is valid within a transmission channel and by selecting the MCS based on which of the one or more MCSs is associated with a best expected throughput.

The receiver 1005, the processing system 1010, the feedback component 1024, the frame generation component 1036, and/or the transmitter 1015 may be configured to perform one or more functions discussed above with respect to blocks 705, 710, 715, 720, 725, 730, 735, 740, 745, and 750 of FIG. 7, to blocks 805, 810, 815, 820, 825, 830, 835, 840, 845, and 850 of FIG. 8, and to blocks 905, 910, 915, 920, 925, 930, 935, 940, 945, and 950 of FIG. 9. The receiver 1005 may correspond to the receiver 612. The processing system 1010 may correspond to the processor 604. The transmitter 1015 may correspond to the transmitter 610. The feedback component 1024 may correspond to the feedback components 124, 126 and/or the feedback component 624.

In one configuration, the wireless communication device 1000 may include means for receiving channel feedback from a second wireless device. The wireless communication device 1000 may include means for determining a frame size based on the received channel feedback for transmitting a frame to the second wireless device. The wireless communication device 1000 may include means for transmitting the frame to the second wireless device based on the determined frame size. In another configuration, the wireless communication device 1000 may include means for transmitting at least one frame to the second wireless device. In this configuration, the wireless communication device 1000 may include means for receiving an ACK frame or a block ACK frame from the second wireless device based on the transmitted at least one frame. The ACK frame or block ACK frame may include the channel feedback. In another configuration, the wireless communication device 1000 may include means for transmitting an RTS frame to the second wireless device. In this configuration, the wireless communication device 1000 may include means for receiving a CTS frame from the second wireless device. The channel feedback may be received in the CTS frame. In another configuration, the channel feedback may be received during a sounding procedure. In another configuration, the wireless communication device 1000 may include means for transmitting a trigger frame to the second wireless device and means for receiving a response frame from the second wireless device based on the transmitted trigger frame. The channel feedback may be received in the response frame. In another aspect, the received channel feedback may include a SINR associated with one or more frames or subframes received by the second wireless device from the wireless communication device 1000, a recommended MCS, a variance of SINRs within a second frame or across multiple frames, a time duration associated with a received MCS, a probability associated with the recommended MCS, a probability distribution associated with the recommended MCS, a time duration associated with the recommended MCS, an average time duration for which the recommended MCS or the received MCS remains constant, and/or a variance of recommended MCSs. In another configuration, the means for determining the frame size may be configured to determine, based on the received channel feedback, an expected duration for which a channel quality is greater than a threshold and to select the frame size based on the determined expected duration for which the channel quality is greater than the threshold. In another aspect, the expected duration may be further based on a history of received channel feedback information. In another configuration, the means for determining the frame size may be further configured to determine a number of MPDUs to include within the frame for transmission to the second wireless device based on the determined expected duration and the selected frame size. In another configuration, the wireless communication device 1000 may include means for determining an MCS for transmitting the frame based on the received channel feedback. In another configuration, the means for determining the MCS may be configured to determine a time period during which one or more MCSs is valid within a transmission channel and to select the MCS based on which of the one or more MCSs is associated with a highest expected throughput.

For example, means for receiving may include the receiver 1005, the processing system 1010, and/or the feedback component 1024. Means for determining may include the processing system 1010, the feedback component 1024, and/or the frame generation component 1036. Means for transmitting may include the transmitter 1015, the processing system 1010, the feedback component 1024, and/or the frame generation component 1036. Means for selecting may include the processing system 1010, the feedback component 1024, and/or the frame generation component 1036.

The various operations of methods described above may be performed by any suitable means capable of performing the operations, such as various hardware and/or software component(s), circuits, and/or module(s). Generally, any operations illustrated in the Figures may be performed by corresponding functional means capable of performing the operations.

The various illustrative logical blocks, components and circuits described in connection with the present disclosure may be implemented or performed with a general purpose processor, a DSP, an application specific integrated circuit (ASIC), an FPGA or other PLD, discrete gate or transistor logic, discrete hardware components or any combination thereof designed to perform the functions described herein. A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

In one or more aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, compact disc (CD) ROM (CD-ROM) or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes CD, laser disc, optical disc, digital versatile disc (DVD), floppy disk and Blu-ray disc where disks usually reproduce data magnetically, while discs reproduce data optically with lasers. Thus, computer readable medium comprises a non-transitory computer readable medium (e.g., tangible media).

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

Thus, certain aspects may comprise a computer program product for performing the operations presented herein. For example, such a computer program product may comprise a computer readable medium having instructions stored (and/or encoded) thereon, the instructions being executable by one or more processors to perform the operations described herein. For certain aspects, the computer program product may include packaging material.

Further, it should be appreciated that components and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a CD or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims. The various figures may depict elements with dotted lines. In some instances, elements depicted with dotted lines may be considered optional features.

While the foregoing is directed to aspects of the present disclosure, other and further aspects of the disclosure may be devised without departing from the basic scope thereof, and the scope thereof is determined by the claims that follow.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f), unless the element is expressly recited using the phrase "means for" or, in the case of a method claim, the element is recited using the phrase "step for."

What is claimed is:

1. A method of wireless communication by a first wireless device, comprising:
   receiving channel feedback from a second wireless device;
   determining, based on the received channel feedback, an expected duration for which a channel quality is greater than a threshold;
   determining a frame size of a frame to be transmitted to the second wireless device based on the determined expected duration for which the channel quality is greater than the threshold, the frame size being based on a number of medium access control (MAC) protocol data units (MPDUs) in the frame; and
   transmitting the frame to the second wireless device based on the determined frame size.

2. The method of claim 1, further comprising:
   transmitting at least one frame to the second wireless device; and
   receiving an acknowledgment (ACK) frame or a block ACK frame from the second wireless device based on the transmitted at least one frame, wherein the ACK frame or block ACK frame includes the channel feedback.

3. The method of claim 1, further comprising:
   transmitting a request to send (RTS) frame to the second wireless device; and
   receiving a clear to send (CTS) frame from the second wireless device, wherein the channel feedback is received in the CTS frame.

4. The method of claim 1, further comprising:
   transmitting a trigger frame to the second wireless device; and
   receiving a response frame from the second wireless device based on the transmitted trigger frame, wherein the channel feedback is received in the response frame.

5. The method of claim 1, wherein the received channel feedback comprises:
   a signal-to-interference noise ratio (SINR) associated with one or more frames or subframes received by the second wireless device from the first wireless device;
   a recommended modulation and coding scheme (MCS);
   a variance of SINRs within a second frame or across multiple frames; or
   a time duration associated with a received MCS.

6. The method of claim 5, wherein the received channel feedback further comprises:
   a probability associated with the recommended MCS or other MCSs;
   a probability distribution associated with the recommended MCS or other MCSs;
   a time duration associated with the recommended MCS or other MCSs;
   an average time duration for which the recommended MCS, the received MCS, or other MCSs remain constant; or
   a variance of recommended MCSs or other MCSs.

7. The method of claim 1, wherein the expected duration is further based on a history of received channel feedback information.

8. The method of claim 1, wherein the determining the frame size further comprises determining the number of MPDUs to include within the frame for transmission to the second wireless device based on the determined expected duration and the selected frame size.

9. The method of claim 1, further comprising:
determining a modulation and coding scheme (MCS) for transmitting the frame based on the received channel feedback.

10. The method of claim 9, wherein the determining the MCS comprises:
determining a time period during which one or more MCSs is valid within a transmission channel; and
selecting the MCS based on which of the one or more MCSs is associated with a highest expected throughput given the expected valid time periods.

11. An apparatus for wireless communication, the apparatus being a first wireless device, comprising:
means for receiving channel feedback from a second wireless device;
means for determining, based on the received channel feedback, an expected duration for which a channel quality is greater than a threshold;
means for determining a frame size of a frame to be transmitted to the second wireless device based on the determined expected duration for which the channel quality is greater than the threshold, the frame size being based on a number of medium access control (MAC) protocol data units (MPDUs) in the frame; and
means for transmitting the frame to the second wireless device based on the determined frame size.

12. The apparatus of claim 11, wherein the means for determining the frame size is further configured to determine the number of MPDUs to include within the frame for transmission to the second wireless device based on the determined expected duration and the selected frame size.

13. An apparatus for wireless communication, the apparatus being a first wireless device, comprising:
a memory; and
at least one processor coupled to the memory and configured to:
receive channel feedback from a second wireless device;
determine, based on the received channel feedback, an expected duration for which a channel quality is greater than a quality threshold;
determine a frame size of a frame to be transmitted to the second wireless device based on the determined expected duration for which the channel quality is greater than the quality threshold, the frame size being based on a number of medium access control (MAC) protocol data units (MPDUs) in the frame; and
transmit the frame to the second wireless device based on the determined frame size.

14. The apparatus of claim 13, wherein the at least one processor is further configured to:
transmit at least one frame to the second wireless device; and
receive an acknowledgment (ACK) frame or a block ACK frame from the second wireless device based on the transmitted at least one frame, wherein the ACK frame or block ACK frame includes the channel feedback.

15. The apparatus of claim 13, wherein the at least one processor is further configured to:
transmit a request to send (RTS) frame to the second wireless device; and
receive a clear to send (CTS) frame from the second wireless device, wherein the channel feedback is received in the CTS frame.

16. The apparatus of claim 13, wherein the channel feedback is received during a sounding procedure.

17. The apparatus of claim 13, wherein the at least one processor is further configured to:
transmit a trigger frame to the second wireless device; and
receive a response frame from the second wireless device based on the transmitted trigger frame, wherein the channel feedback is received in the response frame.

18. The apparatus of claim 13, wherein the received channel feedback comprises:
a signal-to-interference noise ratio (SINR) associated with one or more frames or subframes received by the second wireless device from the first wireless device;
a recommended modulation and coding scheme (MCS);
a variance of SINRs within a second frame or across multiple frames; or
a time duration associated with a received MCS.

19. The apparatus of claim 18, wherein the received channel feedback further comprises:
a probability associated with the recommended MCS;
a probability distribution associated with the recommended MCS;
a time duration associated with the recommended MCS;
an average time duration for which the recommended MCS or the received MCS remains constant; or
a variance of recommended MCSs.

20. The apparatus of claim 13, wherein the expected duration is further based on a history of received channel feedback information.

21. The apparatus of claim 13, wherein the at least one processor is further configured to determine the frame size by determining the number of MPDUs to include within the frame for transmission to the second wireless device based on the determined expected duration and the selected frame size.

22. The apparatus of claim 13, wherein the determined frame size is below a frame size threshold if the received channel feedback indicates that the channel quality is above the quality threshold and if a history of channel feedback information indicates that the channel quality does not remain above the quality threshold for a period of time.

23. The apparatus of claim 13, wherein the determined frame size is above a frame size threshold if the received channel feedback indicates that the channel quality is above the quality threshold and if a history of channel feedback information indicates that the channel quality remains above the quality threshold for a period of time.

24. The apparatus of claim 13, wherein the determined frame size is below a frame size threshold if the received channel feedback indicates that the channel quality is below the quality threshold and if a history of channel feedback information indicates that the channel quality does not remain below the quality threshold for longer than a time period, and wherein the at least one processor is further configured to transmit, after the time period, a second frame with a second frame size greater than the frame size when the channel quality is above the quality threshold.

25. The apparatus of claim 13, wherein the at least one processor is further configured to determine a modulation and coding scheme (MCS) for transmitting the frame based on the received channel feedback.

26. The apparatus of claim 25, wherein the at least one processor is configured to determine the MCS by:
determining a time period during which one or more MCSs is valid within a transmission channel; and
selecting the MCS based on which of the one or more MCSs is associated with a highest expected throughput given the expected valid time periods.

27. A non-transitory computer-readable medium storing computer executable code for wireless communication by a first wireless device, comprising code to:
 receive channel feedback from a second wireless device;
 determine, based on the received channel feedback, an expected duration for which a channel quality is greater than a quality threshold;
 determine a frame size of a frame to be transmitted to the second wireless device based on the determined expected duration for which the channel quality is greater than the quality threshold, the frame size being based on a number of medium access control (MAC) protocol data units (MPDUs) in the frame; and
 transmit the frame to the second wireless device based on the determined frame size.

* * * * *